US009545869B2

(12) United States Patent
Eidsmore

(10) Patent No.: US 9,545,869 B2
(45) Date of Patent: Jan. 17, 2017

(54) SYSTEM AND APPARATUS FOR LOADING/UNLOADING CARGO FROM SUV OR TRUCK BED

(71) Applicant: Paul G. Eidsmore, Santa Cruz, CA (US)

(72) Inventor: Paul G. Eidsmore, Santa Cruz, CA (US)

( * ) Notice: Subject to any disclaimer, the term of this patent is extended or adjusted under 35 U.S.C. 154(b) by 77 days.

(21) Appl. No.: 14/373,601

(22) PCT Filed: Jan. 17, 2013

(86) PCT No.: PCT/US2013/021966
§ 371 (c)(1),
(2) Date: Jul. 21, 2014

(87) PCT Pub. No.: WO2013/109772
PCT Pub. Date: Jul. 25, 2013

(65) Prior Publication Data
US 2015/0003944 A1 Jan. 1, 2015

Related U.S. Application Data

(60) Provisional application No. 61/589,093, filed on Jan. 20, 2012.

(51) Int. Cl.
*B60P 1/44* (2006.01)
*B60P 1/64* (2006.01)
*B66F 7/06* (2006.01)
*B60P 1/00* (2006.01)
*B60P 1/43* (2006.01)

(52) U.S. Cl.
CPC .............. *B60P 1/6427* (2013.01); *B60P 1/003* (2013.01); *B60P 1/433* (2013.01); *B60P 1/4414* (2013.01); *B60P 1/6409* (2013.01); *B66F 7/0608* (2013.01)

(58) Field of Classification Search
CPC ........ A61G 3/062; B60P 1/022; B60P 1/4414; B60P 1/4442; B60P 1/4471; B60P 1/6427; B60R 5/041; B66F 7/0608; B66F 7/0683
See application file for complete search history.

(56) References Cited

U.S. PATENT DOCUMENTS

| 2,386,005 | A | | 10/1945 | Raup | |
|---|---|---|---|---|---|
| 2,490,014 | A | * | 12/1949 | de Villiers | B60R 5/041 224/491 |
| 2,549,018 | A | * | 4/1951 | Sarlo | B60R 5/041 16/19 |

(Continued)

OTHER PUBLICATIONS

PCT/US2013/021966 International Search Report/Written Opinion.

*Primary Examiner* — James Keenan
(74) *Attorney, Agent, or Firm* — Fay Sharpe LLP

(57) ABSTRACT

A lift mechanism for an associated cargo carrier includes a rail configured for sliding movement between a first position received within a footprint of the carrier and a second position extended outwardly from the carrier footprint. A leg assembly is configured for extending movement between a first position received in the rail and a second position extending outwardly from the rail. When the rail and leg assembly are in the respective first positions, the leg assembly is stored along the carrier, and when the rail and leg are in the respective second positions, the leg assembly supports the cargo carrier. A drive arrangement selectively raises and lowers the leg assembly between the first and second positions to raise and lower the cargo carrier relative to the vehicle bed.

29 Claims, 42 Drawing Sheets

(56) References Cited

U.S. PATENT DOCUMENTS

| | | | | |
|---|---|---|---|---|
| 2,676,720 A | * | 4/1954 | Noble | B60P 1/4414 254/10 C |
| 2,732,960 A | * | 1/1956 | Nilson | B60P 1/4414 414/549 |
| 2,862,689 A | | 12/1958 | Dalrymple et al. | |
| 3,189,199 A | * | 6/1965 | Eaton | B60P 1/6427 14/71.1 |
| 3,226,086 A | * | 12/1965 | Lavieri | B60P 1/4414 254/124 |
| 3,785,462 A | | 1/1974 | Coad et al. | |
| 4,405,116 A | * | 9/1983 | Eisenberg | B66F 7/0608 187/269 |
| 4,813,842 A | | 3/1989 | Morton | |
| 4,867,277 A | * | 9/1989 | Sloan | B66F 7/0608 187/269 |
| 4,958,979 A | * | 9/1990 | Svensson | B60P 1/4435 182/158 |
| 4,969,793 A | | 11/1990 | Pawl | |
| 5,632,209 A | | 5/1997 | Sakakibara | |
| 5,644,510 A | | 7/1997 | Weir | |
| 5,833,198 A | | 11/1998 | Graetz | |
| 5,975,830 A | * | 11/1999 | Goodrich | B60P 1/02 414/541 |
| 6,024,528 A | * | 2/2000 | Taylor | A61G 1/06 296/20 |
| 6,971,967 B2 | * | 12/2005 | Whitmarsh | A61G 3/062 475/149 |
| 7,670,097 B2 | | 3/2010 | Horton | |
| 8,398,358 B2 | * | 3/2013 | L'Ecuyer | B60P 1/4442 414/522 |
| 2006/0051191 A1 | * | 3/2006 | Dupuy | B60P 1/4457 414/522 |
| 2010/0047048 A1 | * | 2/2010 | Zimmermann | B60P 1/4471 414/540 |
| 2010/0329831 A1 | * | 12/2010 | Tornese | B60P 1/4435 414/544 |
| 2011/0280700 A1 | * | 11/2011 | Uttech | A61G 7/1019 414/540 |
| 2016/0031354 A1 | * | 2/2016 | Miles | B60P 1/4414 211/1.51 |

* cited by examiner

SYSTEM AND APPARATUS FOR LOADING/UNLOADING CARGO FROM SUV OR TRUCK BED

This application claims the priority benefit of U.S. provisional application Ser. No. 61/589,093, filed 20 Jan. 2012.

BACKGROUND

The subject of this disclosure is an apparatus for loading and unloading cargo into and out of a pickup truck, van, SUV, or any vehicle capable of carrying cargo and/or equipment. Sales of light trucks and sport utility vehicles (SUV) have steadily grown year after year and recently outsold cars for the first time in history. The demand for these multi-purpose vehicles has led to the creation of numerous makes and models, and also the need for new, innovative accessories that take advantage of the heavy-duty nature of these vehicles.

Light trucks have a truck bed and SUVs typically have a large cargo space for hauling or transporting goods and materials. For example, the truck bed is typically an open topped chamber or cavity in which a rear end is selectively closed by a pivoting or removable tailgate. It is well known to employ truck bed liners, normally a liner that is permanently installed to the interior surface of the truck bed. Similarly, with SUVs, a pivoting hatchback door allows access to a rear storage compartment. Manufacturers provide for fold-down seats to maximize the amount of cargo space available to the user. Unfortunately, these cargo spaces are also a part of the SUV interior and only certain types of materials are conveniently mounted in the rear storage compartment.

It is common to use these light trucks and SUVs for hauling a variety of materials. For example, construction tools, mulch, topsoil, debris, etc. are temporarily stored in the truck bed or SUV cargo space.

A need exists, however, for a vehicle bin that maximizes the efficient use of these storage areas. Moreover, a need exists for such an arrangement that can be provided without undue alteration or modification of the truck bed or cargo space of the light truck or SUV.

SUMMARY

A lift mechanism for an associated cargo carrier includes a rail configured for sliding movement between a first position received within a footprint of the carrier and a second position extended outwardly from the carrier footprint. A leg assembly is configured for extending movement between a first position received in the rail and a second position extending outwardly from the rail. When the rail and leg assembly are in the respective first positions, the leg assembly is stored along the carrier, and when the rail and leg are in the respective second positions, the leg assembly supports the cargo carrier. A drive arrangement selectively raises and lowers the leg assembly between the first and second positions to raise and lower the cargo carrier relative to the vehicle bed.

The leg assembly includes first and second legs that selectively pivot relative to one another and also selectively pivot relative to the rail.

The first and second legs are pivotally connected to one another along respective mid-portions to provide an x-shaped or scissors-shaped lift arrangement.

The leg assembly is dimensioned and configured for nesting receipt in the rail in the first position of each of the rail and leg.

The second leg includes first and second leg portions that articulate relative to one another.

The carrier is tilted relative to horizontal by selectively disconnecting one of the first and second leg portions from the drive arrangement and driving the remaining leg portion for articulating action relative to the other leg portion.

The drive arrangement includes detachable first and second links and a slide bolt that selectively engage the first and second leg portions together in a first position so that the leg portions are locked in linear alignment. The links are selectively disengaged in a second position that allows the first and second leg portions to articulate relative to one another and causes the associated carrier to tilt as the drive arrangement is raised or lowered.

The drive arrangement includes an oppositely threaded drive screw driven by a motor. The drive screw has a right-hand pitch first portion on a first end and a left-hand pitch second portion on a second end, and only one of the leg portions operatively engages the oppositely threaded drive screw so that rotation of the drive screw drives only one of the first and second leg portions.

The drive arrangement includes a drive block that has a split nut selectively engaging and disengaging a drive screw of the drive arrangement.

The drive arrangement further includes a solenoid that selectively urges the split nut into engagement with the drive screw.

The leg portions have different hinge points connecting the leg portions to the second leg.

The leg assembly includes first and second legs each having rollers that engage the rail so that the lift mechanism can be extended and retracted relative to the associated cargo carrier.

A transfer rail is supported at a first end by a support leg that is connected by either (i) a lever that has a bearing received in the rail, and the lever is biased by spring or (ii) a cable, and supported at a second end by a roller.

A hinged bridge extends between a first end of the rail and an associated vehicle and travels upwardly and downwardly in response to a changing level of the associated vehicle.

At least one of the first and second legs includes first and second rollers at one end to eliminate a gap between the roller and associated rail.

A cross bar is attached to an associated vehicle along a pivot region of a tailgate with the vehicle. The cross bar includes at least one motor-driven roller for advancing and retracting the leg assembly, rail, and carrier in and out of a bed the associated vehicle.

Latches selectively engage the carrier to prevent the carrier, leg assembly, and rail from being extended from the associated vehicle bed.

A mechanism for raising the leg assembly into nested relation in the rail has one of (i) a fine pitch screw portion and a coarse pitch screw portion with a tube or (ii) a flexible cable and pulley assembly.

A lever on one end of the leg assembly provides a mechanical advantage to initiate lifting of the carrier from the stored position of the rail.

A tailgate has at least of (i) an opening in the tailgate or (ii) a central reduced height section to facilitate a driver's view to the rear.

A spool is mounted on one end of a drive screw of the drive arrangement. The spool includes a clutch assembly that selectively allows the spool to rotate with or rotate freely relative to the drive screw.

The leg assembly includes a first leg and the second leg having first and second portions that selectively pivot relative to one another. The first leg includes first and second motors respectively connected to the first and second portions of the second leg for individually altering an angle therebetween.

The leg assembly includes first and second legs each including an enlarged roller at a distal end thereof.

The rollers are mounted to the respective legs by caster mechanisms.

A self-leveling connection is provided between each caster mechanism and associated leg.

The drive arrangement includes an over-travel mechanism to limit potential damage thereto.

The carrier includes a rail extending therefrom for holding the carrier a proper distance from an associated vehicle as the carrier is loaded and unloaded.

A sensor and a controller monitor an overload situation between first and second motors.

A lift mechanism for an associated cargo carrier includes a spool, and a drive motor that selectively rotates the spool. A first flexible strap has a first end that is secured to the spool and a second end that is secured to a distal end of the cargo carrier. A lever is pivotally secured to an associated vehicle that cooperates with a guide channel on the associated carrier for orienting the associated carrier as the carrier is pulled into the associated vehicle.

A stop mechanism or an air spring cooperates with the lever to limit or retard rotation of the lever in one direction.

A primary advantage relates to a lift mechanism that is highly versatile and can be easily incorporated into a truck bed or cargo area of a vehicle.

DETAILED DESCRIPTION

Figure 1:
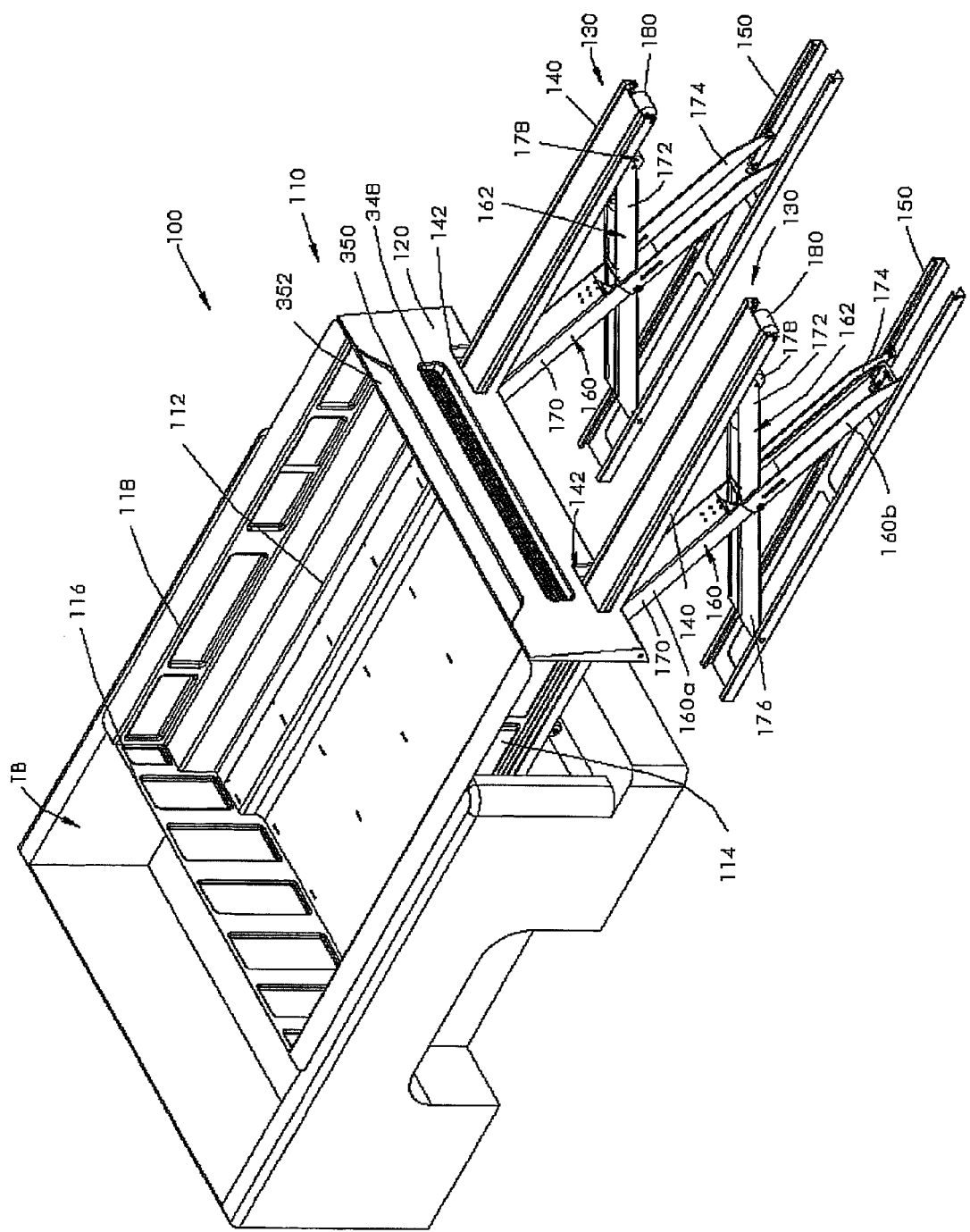
FIGS. 1-20 illustrate a loading/unloading cargo system.

With reference to FIGS. 1-4, this loading/unloading cargo system 100 uses a bin(s) or carrier(s) 110 for containing the cargo (not shown). The carrier 110 is dimensioned for receipt in an associated vehicle such as the illustrated truck bed TB, although the carrier can be similarly dimensioned for receipt in a cargo compartment of other vehicles such as vans, SUVs, etc. The carrier 110 may adopt a wide variety of designs but generally speaking includes a first or bottom wall 112 and typically at least three contiguous sides or sidewalls generally denoted as first, second, and third sidewalls 114, 116, 118 that extend generally upwardly from the bottom wall. A fourth sidewall 120 also extends generally upwardly from the bottom wall 112 and the fourth sidewall is preferably hinged or selectively removable from the remainder of the carrier 110, although it is also contemplated that the fourth sidewall may also extend upwardly from the bottom wall and be joined to adjacent sidewalls to form an open-top carrier. By way of example only, the carrier 110 is preferably an open-top, substantially rigid structure that is seamless along the bottom and sidewalls 112-118 so that a wide variety of cargo or materials may be stored in the carrier, although it is contemplated that a cover or removable cover may be received over the carrier cavity in some instances. When the carrier 110 is received in the associated vehicle, the cargo is effectively retained in the carrier, and the truck bed or cargo compartment of the vehicle generally remains free of cargo (i.e., dirt, debris, etc. is contained in the carrier and does not spill into the truck bed or vehicle cargo compartment). The carrier (bottom wall and sidewalls) is preferably constructed or formed from a high-strength material of construction that may or may not include a reinforcing core. Materials that exhibit durability, resistance to damage such as scratching, ability to conform to a wide variety of shapes and profiles, ease of manufacture, and when seamlessly formed between the sidewalls 114-118 and the bottom wall 112, the material may also provide a moisture impervious waterproof structure to protect the vehicle bed and/or vehicle cargo compartment would be preferred.

A vehicle may have one or more carriers 110 intended for separate, individual use with the vehicle and ideally dimensioned to substantially fill the entire available volume in the truck bed or vehicle cargo compartment. However, the present disclosure also contemplates that more than one carrier may be used at the same time (and thus be dimensioned less than the available volume in the truck bed/cargo compartment) if the multiple carriers are suitably dimensioned for receipt in the available vehicle cavity. Likewise, different carriers 110 may have different configurations or designs for different types of cargo, and thus the carriers are adapted to be easily exchanged in and out of vehicle. For example, a simple form of carrier 110 could be used to transport loose material such as dirt, sand, or gravel, while the bottom wall or base platform 112 of a different carrier may include customized or specific racks (not shown) installed for mounting and transporting heavy equipment such as a generator, camper, motorcycle, tool bins, or other equipment. Typically, however, the individual, different carriers (although suitable for different end uses) have the same general footprint and some common features that allow ease of receipt in and removal from the truck bed/vehicle cargo compartment as will described further below.

Figure 2:
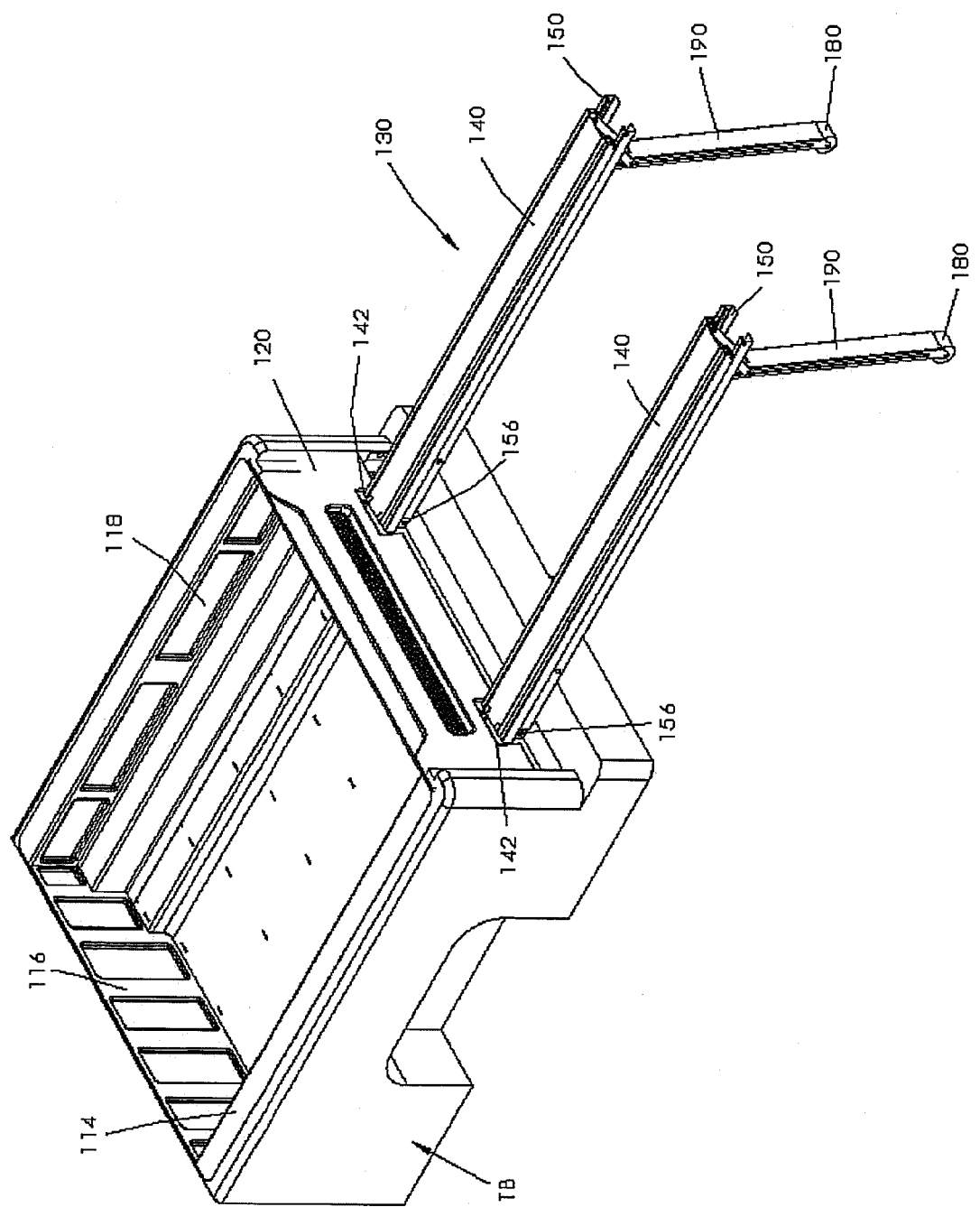

As shown in FIGS. 1 and 2, and additionally detailed in FIGS. 5-29, the cargo loading/unloading system or apparatus 100 incorporates a lift mechanism such as the illustrated first and second scissor-type lifts or lift assemblies 130 for raising and lowering the carrier 110 relative to the truck bed, vehicle compartment or ground surface. Unless noted otherwise, these lifts 130 are preferably structurally and functionally identical so that description of one applies to the other. The lifts 130 are located in spaced, generally parallel relation relative to the carrier 110 and preferably mounted along the bottom wall 112 and adjacent outer edges thereof to provide balance and stability during raising/lowering of the carrier, and transfer of the carrier into and out of the cargo compartment.

Figure 3:
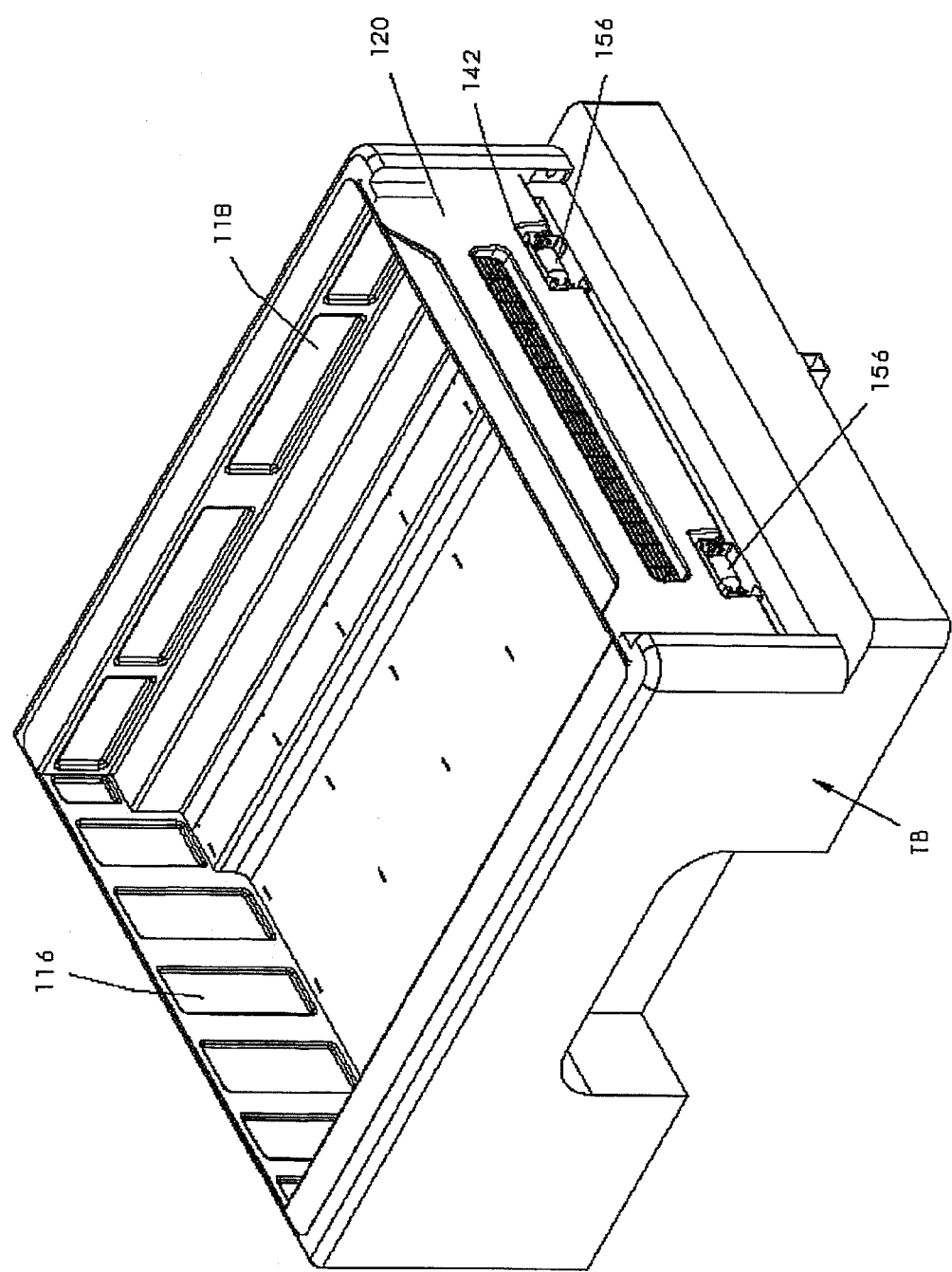
Figure 24:
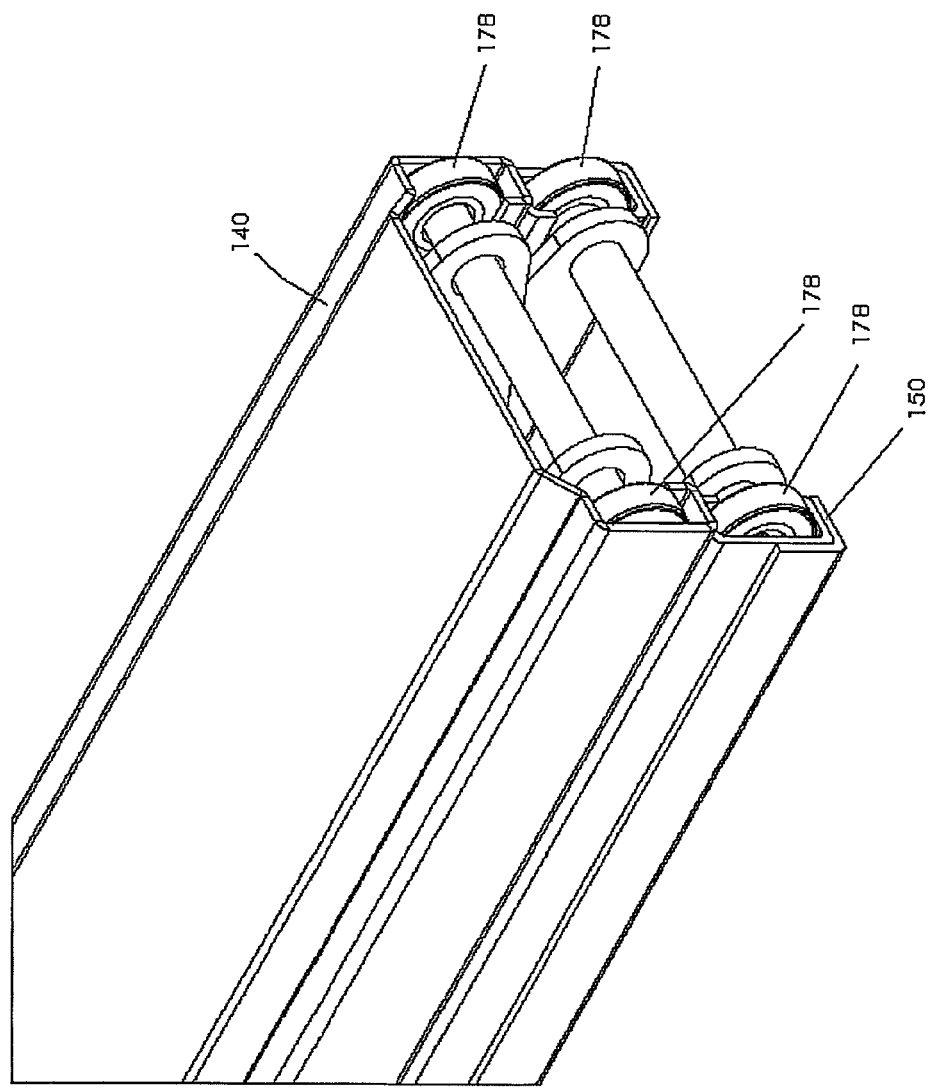

In one embodiment, each lift 130 (FIGS. 1 and 4) includes an elongated transfer rail 140 that preferably has an inverted U-shaped cross-section and is received for selective sliding receipt in a similarly shaped cavity or recess 142 in the bottom wall. In addition, each lift includes a base rail 150 that preferably has a U-shaped cross-section. FIG. 3 illustrates the rails 140, 150 received in the recess 142, and FIG. 24 is an enlarged view of a transfer rail 140 that fits on top of the base rail 150 in a stowed or non-extended position.

Each lift further includes first and second legs 160, 162 that are pivotally secured to one another around midpoints 164 and thereby form a generally x-shaped conformation. The first leg 160 includes a first, half-leg portion 160*a* and a second, half-leg portion 160*b* that together cooperate to define the first leg. The first portion 160*a* has the ability to articulate independently of the second portion 160*b*, and also independently of the second leg 162 which is preferably an elongated, single leg structure. Further details of the structure and operation of the first and second leg portions 160*a*, 160*b* to create the ability for the lift to tilt the carrier 110 toward the truck (FIG. 9) and tilt away from the truck (FIG. 10) for gravity loading as well as dumping (FIG. 8) will be provided below.

When first or upper ends 170, 172 of each leg 160, 162 are brought toward one another as the upper ends of the legs slide in respective transfer rails 140, and likewise when second or lower ends 174, 176 of the legs 160, 162 are brought toward one another as the lower ends of the legs slide in respective base rails 150 of the lift mechanism, the lift moves toward a maximum height or maximum vertical dimension between the transfer and base rails 140, 150. Similarly, when the upper ends 170, 172 and lower ends 174, 176 are longitudinally spaced apart, the lift mechanism moves toward a minimum height or minimum vertical dimension between the transfer and base rails 140, 150.

Figure 4:
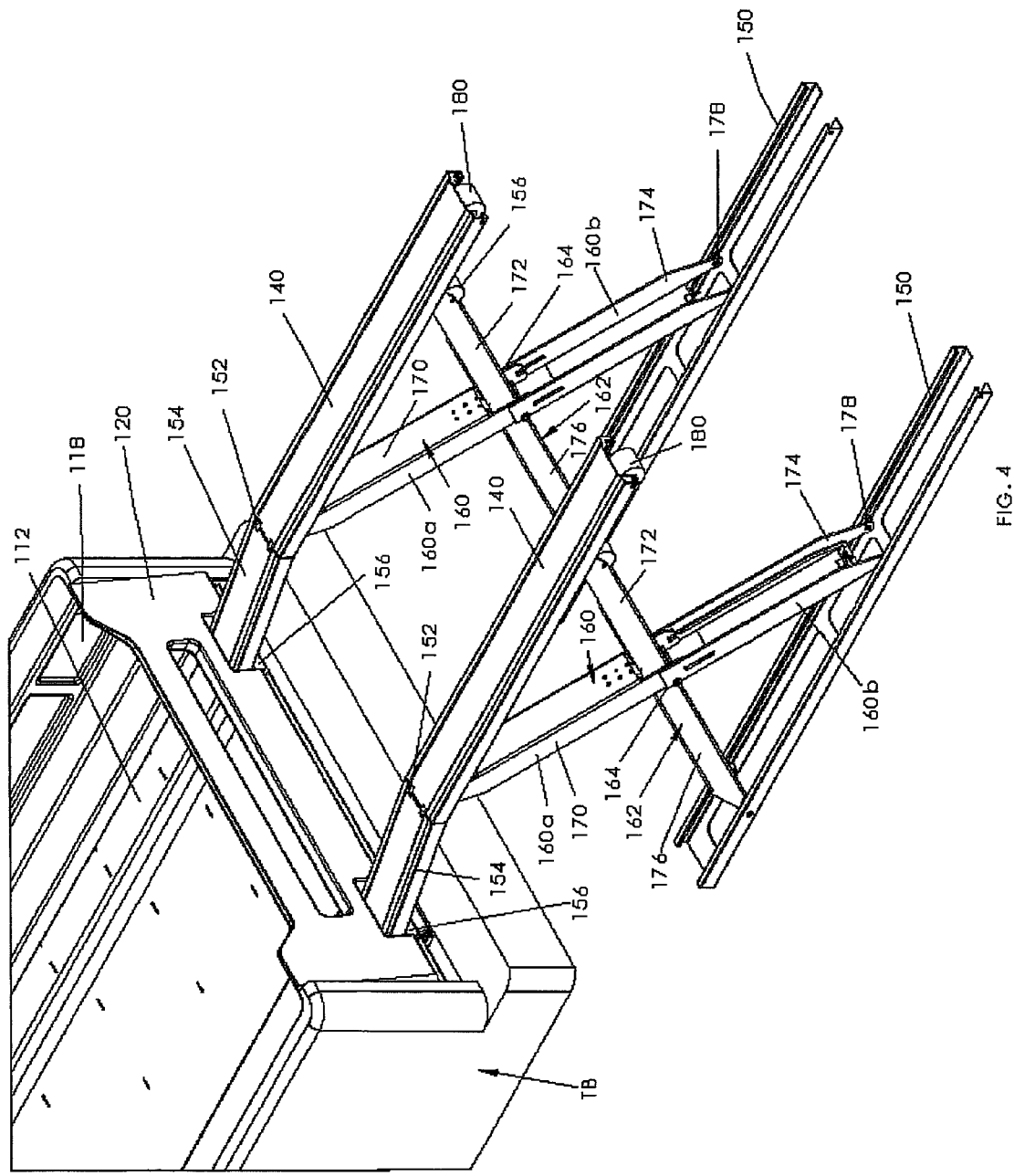

Each leg end preferably includes a roller or roller bearing 178 (FIG. 5) dimensioned for receipt in the corresponding rail (either transfer rail 140 or base rail 150—see FIGS. 1 and 4) that allows the leg ends to move relative to one another and selectively raise and lower the transfer rails and base rails relative to another (i.e., raise or lower the lifts and likewise the carrier if the carrier is supported on the lifts). Thus, the raised configuration is shown in FIGS. 1 and 4, and a partially collapsed arrangement is shown in FIG. 2. When fully collapsed, the rails 140, 150 abut one another along their extended lengths. One skilled in the art will also appreciate that the legs 160, 162 are dimensioned for nested receipt within the rails 140, 150 in the collapsed condition. The leg assemblies preferably are folded metal beams or formed "U" shaped channels that can nest together creating a very low profile when the lift is in the lowest position. This low profile allows the carrier to be very close to the ground making it easier to get the cargo on or off the lifts from/to the ground surface. The same shaped legs can be extruded from aluminum. Of course, other shapes can be used without departing from the scope and intent of the present disclosure.

The rollers 178 (FIG. 5) on the leg ends engage the transfer rails 140 on the carriers 110. The rollers 178 allow the lifts to be rolled in and out of the vehicle when the rails are disposed in nested relation and when the lifts are fully collapsed (FIGS. 2 and 24). After loading a carrier 110 into the vehicle (e.g., rolling the carrier along the transfer rails 140 into the cargo compartment of the vehicle), the lifts 130 can be raised to a folded or nested position (FIG. 2) and then rolled into the recesses 142 in the carrier base wall 112 to be readily available to unload the carrier at the next location of the vehicle (FIGS. 2 and 3). Likewise, when the carrier is to be unloaded from the vehicle, the transfer rails 140 are first advanced relative to the carrier 110 to the extended position shown in FIG. 2, and then the lifts extended so that the base rails 150 are positioned on the ground surface (FIG. 4). The legs of the lifts are deployed into the x-configuration and support legs 190 (FIGS. 1 and 2) are pivoted downwardly from the transfer rails toward the base rails to provide further support and stability to the lift arrangement. Once the base rail is supported on the ground surface, and the lift legs 160 and support legs 190 situated in place, the carrier is advanced along the transfer rails from the cargo compartment (FIGS. 9 and 10) where the lifts are subsequently collapsed and the carrier lowered to the ground surface.

The transfer rail 140 makes it possible to roll the carrier 110 into the vehicle without the carrier becoming detached from the lift mechanism 130 thus creating a safer cargo transfer. The transfer rail 140 preferably has a hinge 152 between the vehicle and the lift mechanism. This hinge 152 is as far away from the vehicle as possible and as close to the lift 130 as possible creating a hinged bridge 154 (FIG. 4). This bridge section 154 between the lift and the vehicle has a roller 156 on the end that rests in the vehicle which allows the bridge section to travel up and down in response to the changing level of the vehicle bed due to increasing or decreasing loads. A slide under the transfer rail will lock the bridge section in the straight position for raising the legs (FIG. 4).

More particularly, the suspension travel of the vehicle allows the height of the cargo bay to vary drastically as a heavy load is transferred into the cargo bay. One consideration is to include sensors on the truck and lift, and the motors could adjust the height of the lift as the height of the truck varied. However, if a heavy load is pushed in quickly, the height of the truck drops quickly and may even bounce a bit and the motors are unable to keep up. So, instead the hinge 152 in the transfer rail as shown in FIG. 4 was one proposed solution to this problem. The front of the hinged portion could rest in the truck and go up and down with the motion of the truck. This works well but the carrier 110 has to pivot over the hinge point 152 which is not as desirable as other solutions described below (the double pitch screw arrangement described below in connection with FIG. 19, for example).

The two scissor leg assemblies of the lifts 130 are spaced as far apart as the vehicle cargo bay or cargo compartment will allow. Each lift has rollers 178 at their perimeters. The bottom rollers engage a base rail 150 while the top rollers engage the transfer rails 140, which in turn has rollers that engage the carrier rails (FIG. 6) creating a wide and stable stance for lifting and transfer loading (FIG. 1).

Figure 6:
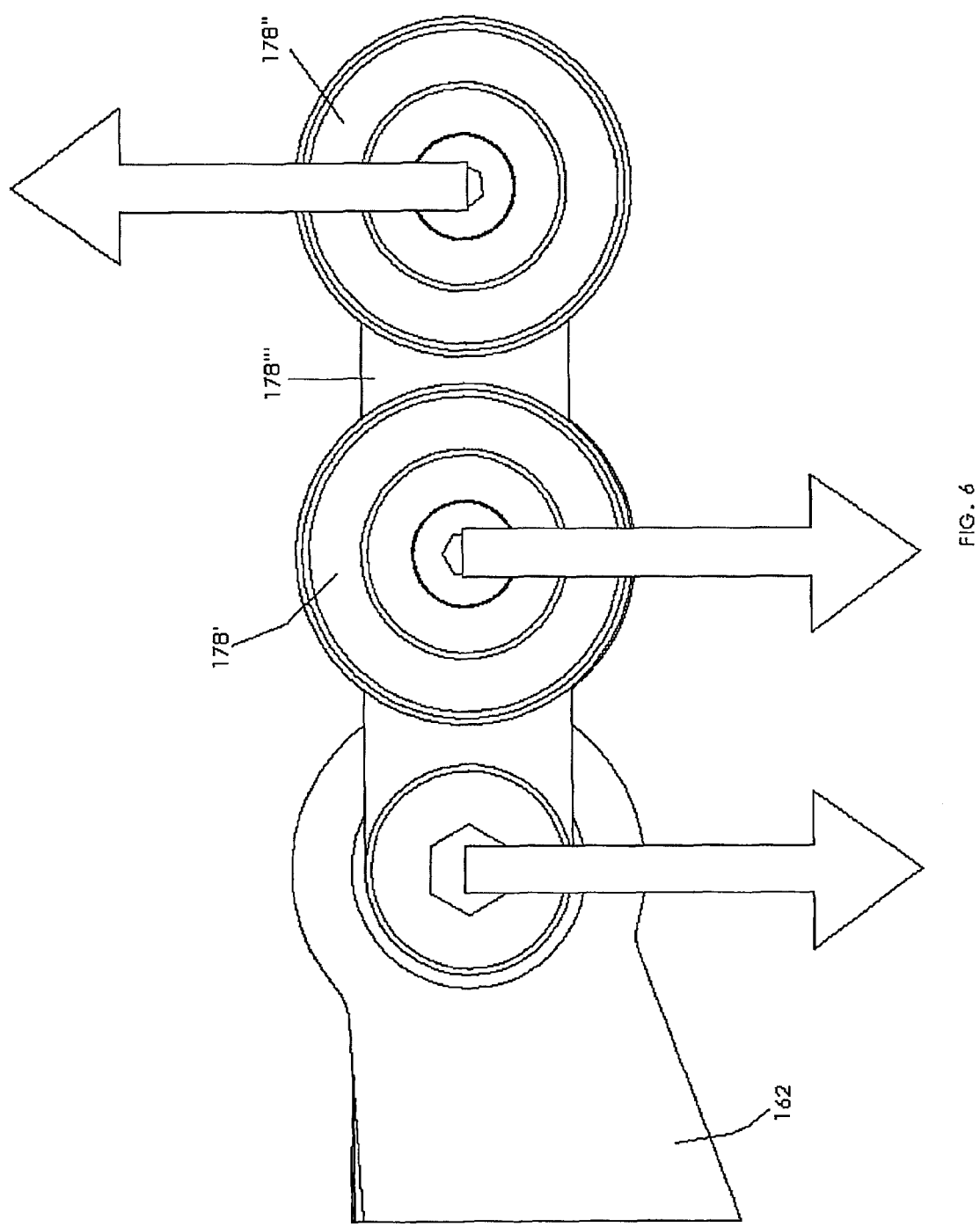

As noted above, there are roller bearings 178 located on each end of the lift legs 160, 162 and on each side of the "U" shaped legs for engaging the transfer and base rails 140, 150. When only one roller is used in each location, the force is either on the inside top, or bottom of the rail, hence a tolerance gap exists on the other side of the roller creating a wobbly or unstable situation. If two rollers 178', 178" mounted to a single bracket 178''' are used, the forces are directed down on one roller 178' and up on the other roller 178", eliminating the gap between the roller and the rail and creating a more stable lifting mechanism (FIG. 6).

Figure 8:
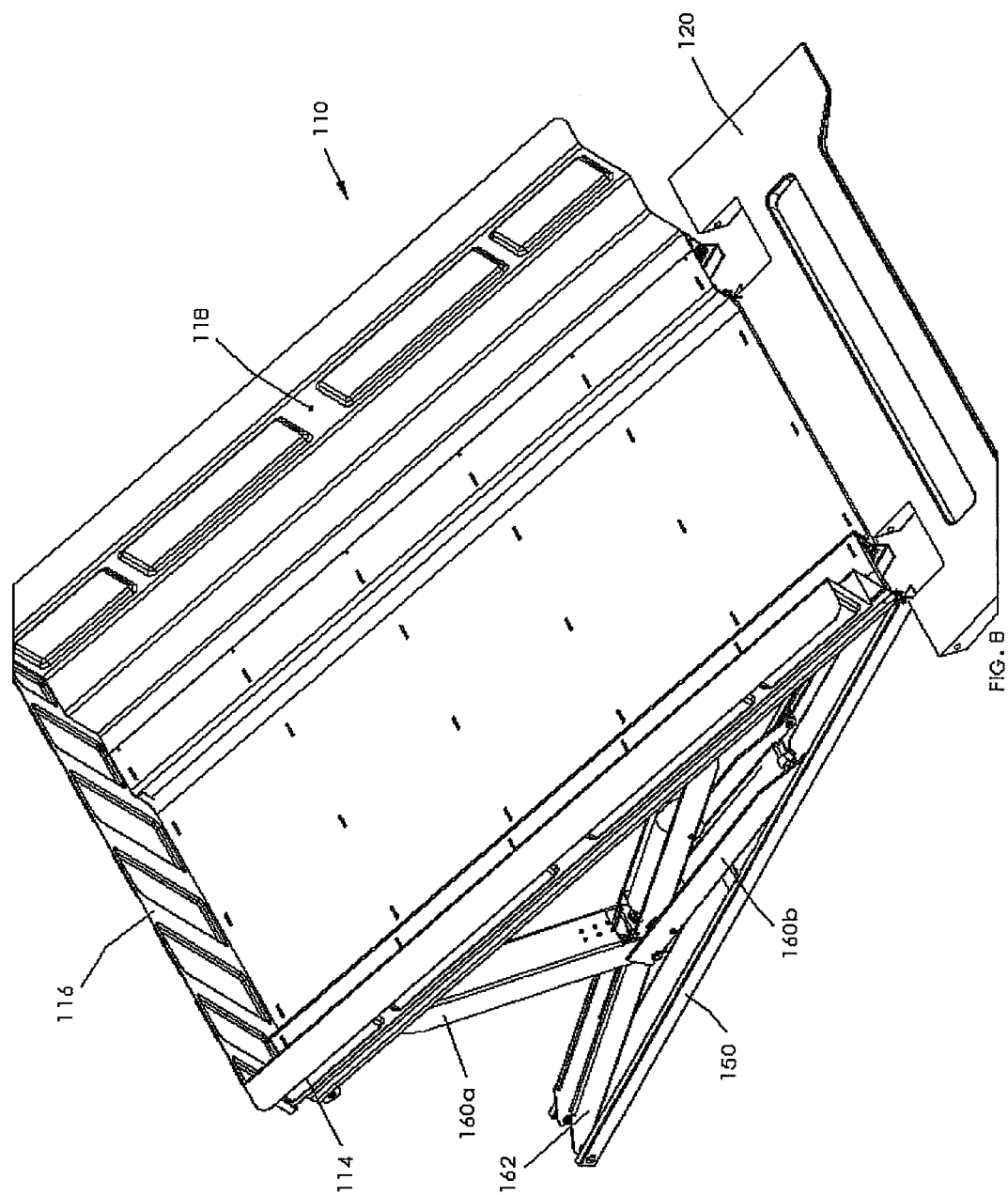
Figure 9:
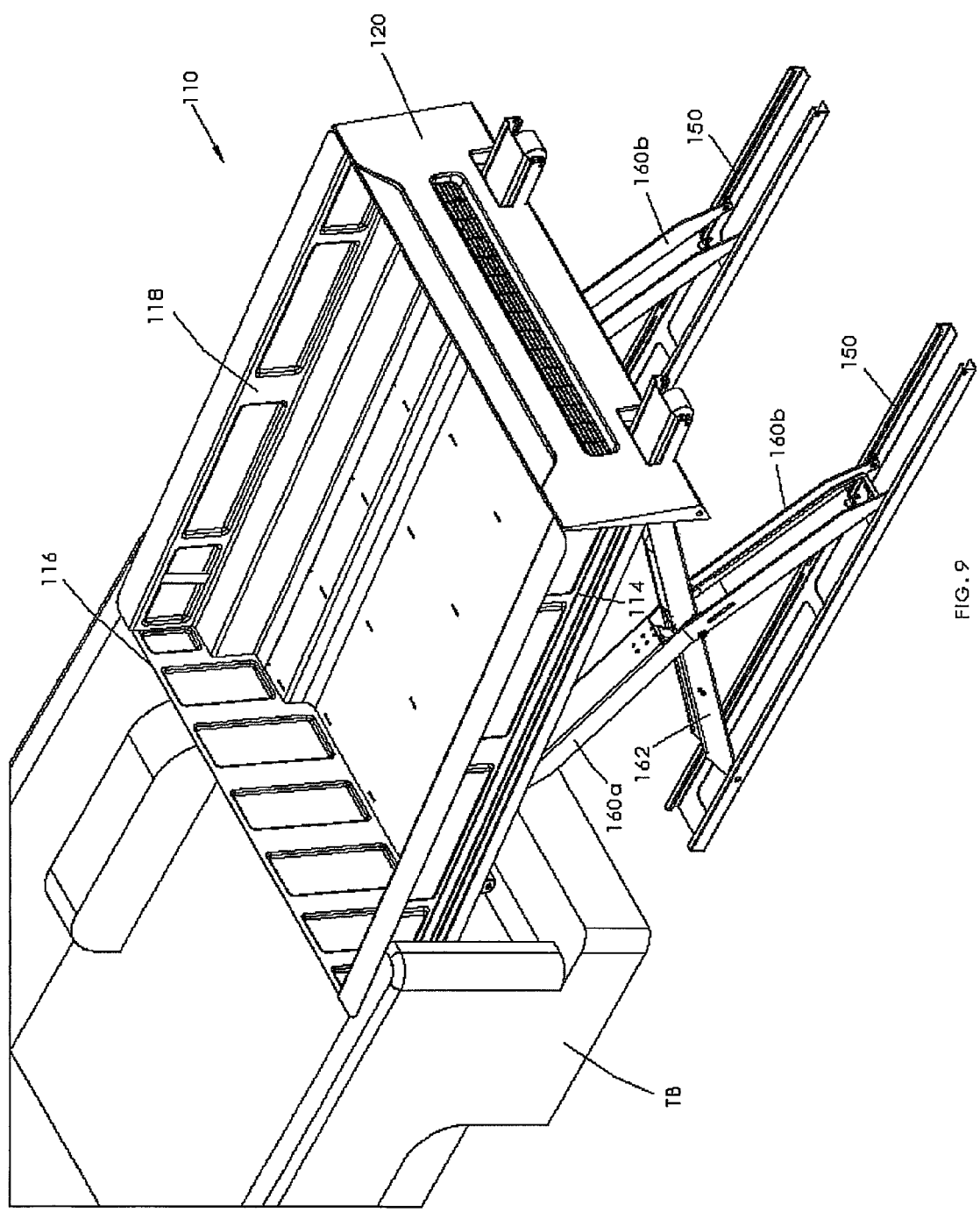
Figure 10:
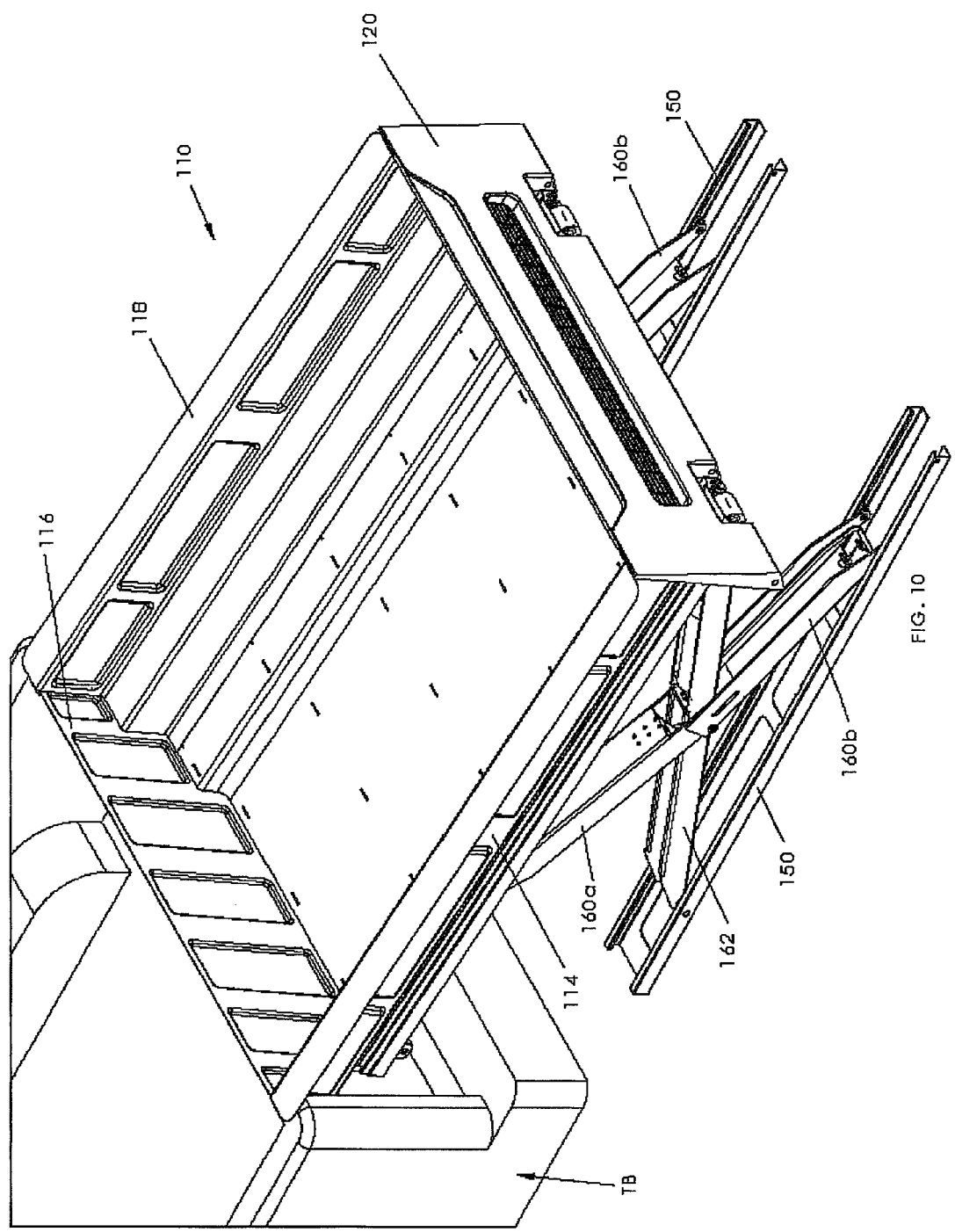

With reference to FIGS. 8-10, the concept of two short leg portions 160*a*, 160*b* operating independently is illustrated. This requires a modified drive arrangement (for example, the double pitch drive screw and detachable links concept described below in connection with FIG. 19). This concept of two short legs 160*a*, 160*b* makes it possible to roll the transfer rail 140 and carrier 110 in just far enough for the front roller 156 on the transfer rail to sit in the truck bay. In this way, a user can lower the lift and let the weight of the front half of the load rest on the back edge of the cargo bay of the truck. Once the load is removed from the front, the lower short leg can be detached from the drive mechanism. Then, the rear leg can be raised independently of the front leg and thereby creating the tilting angle so gravity can roll the carrier in (FIG. 9). The front leg being disconnected from the drive screw and resting in the truck is free to move up or down with the movement of the truck. Once the carrier is in the cargo bay, the transfer rail 140 is held up by the support leg 190 or the new cantilever idea described below so the legs of the lift can be lifted to the nested position and rolled into the vehicle. Of course one skilled in the art will appreciate that all of these events happen in reverse for unloading.

Figure 5:
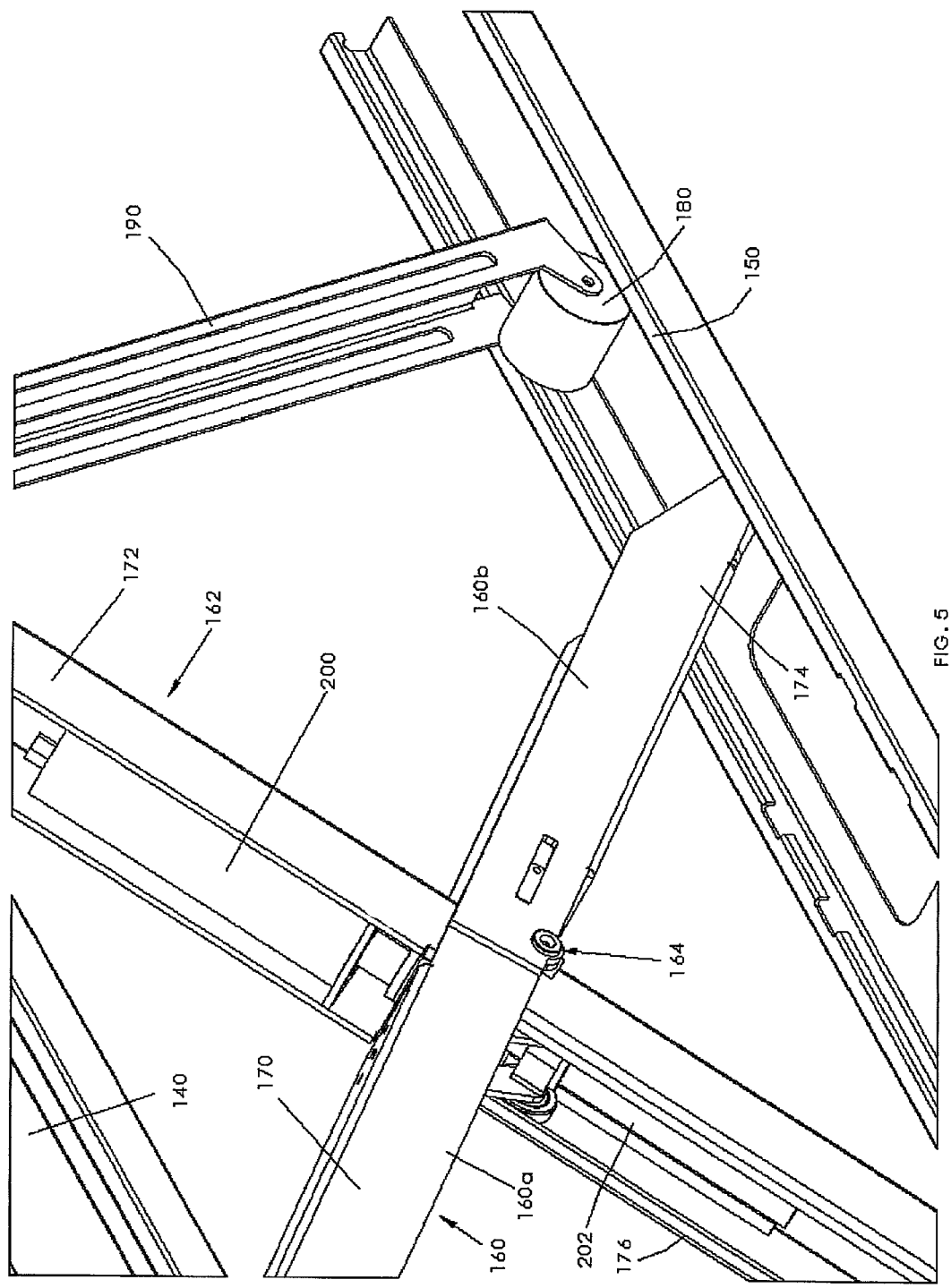
Figure 12:
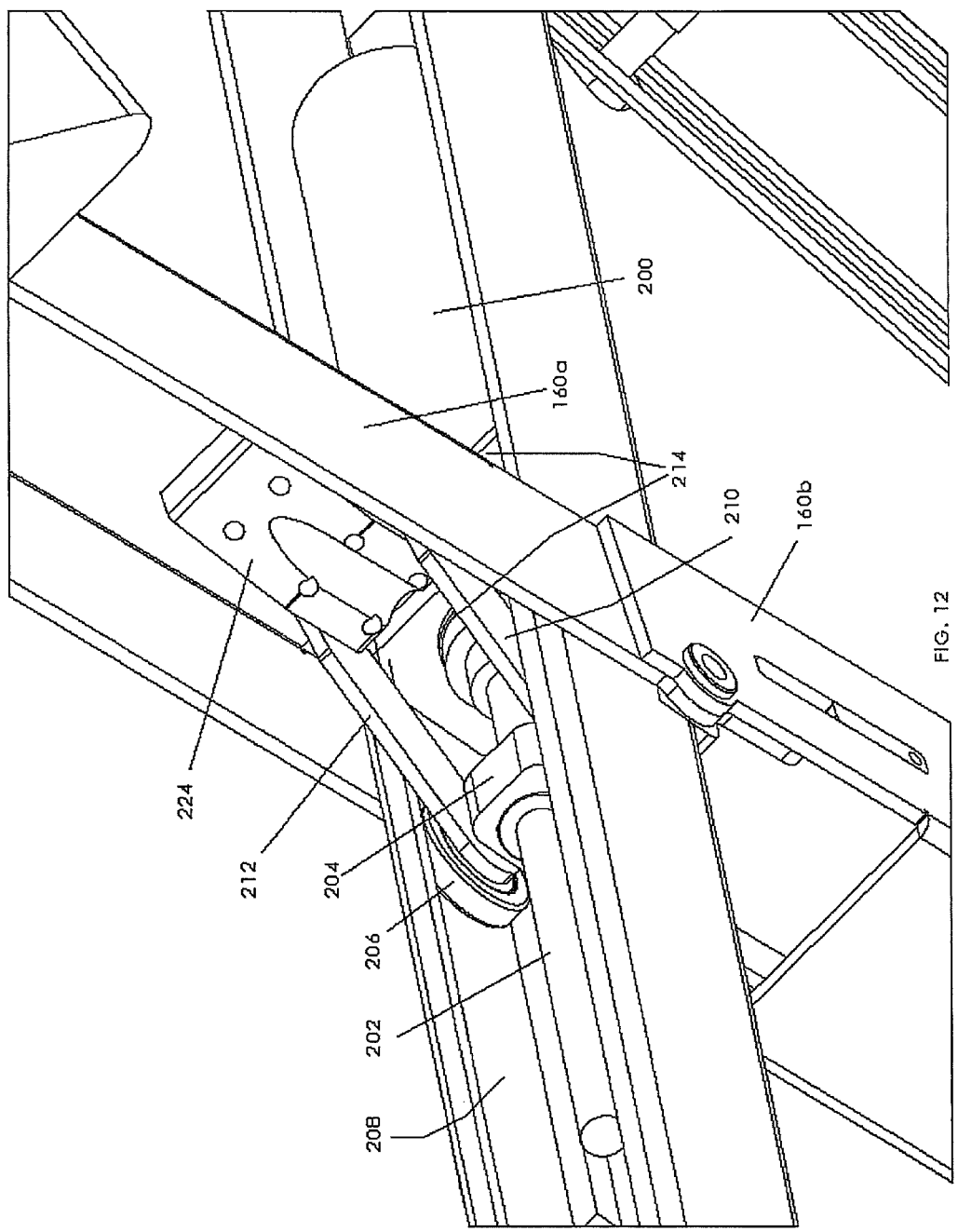
Figure 13:
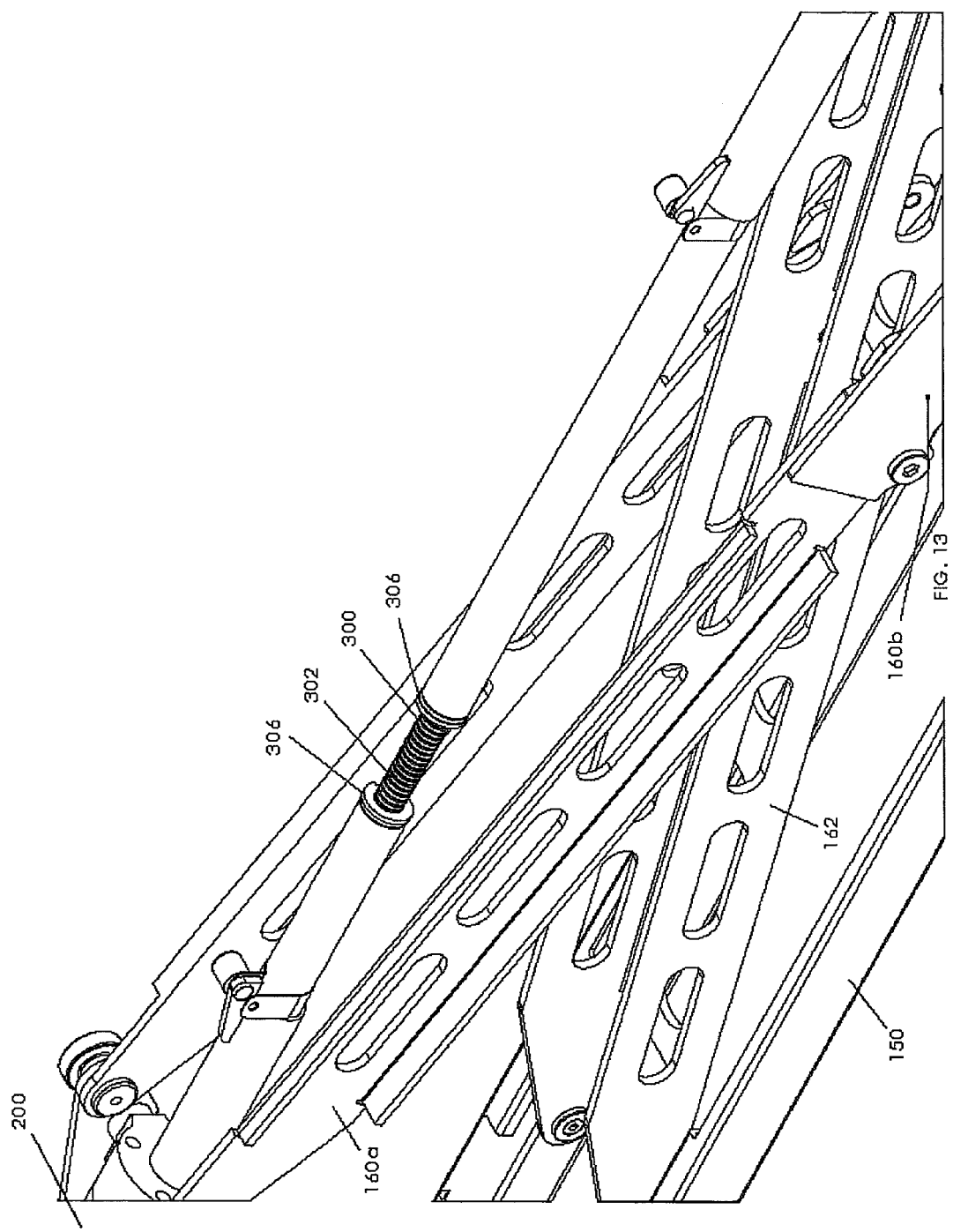

Power to operate the lifts 130 and raise/lower the carriers 110 preferably comes from two electric gear head motors 200 (FIGS. 5 and 12). A motor 200 is mounted within the inner leg channel in each lift mechanism. The motor 200 rotates an acme threaded drive screw 202 which drives a block assembly 204 (FIG. 12). This block assembly 204 has bearings 206 that travel in a track 208 on the inside of the leg and has two mechanical links 210, 212 (FIGS. 12 and 16) that attach to the upper leg of the lift mechanism. The location of where the mechanical links 210, 212 attach to the upper leg and the length of the links are crucial in order to create a consistent ratio of drive screw 202 travel to the vertical lift of the carrier (FIG. 12). Thrust bearings 214 are provided to prevent load transfers to the motor shaft. This lift could also be operated by pneumatic or hydraulic pumps and cylinders as a substitute for the electric motors 200.

Figure 7:
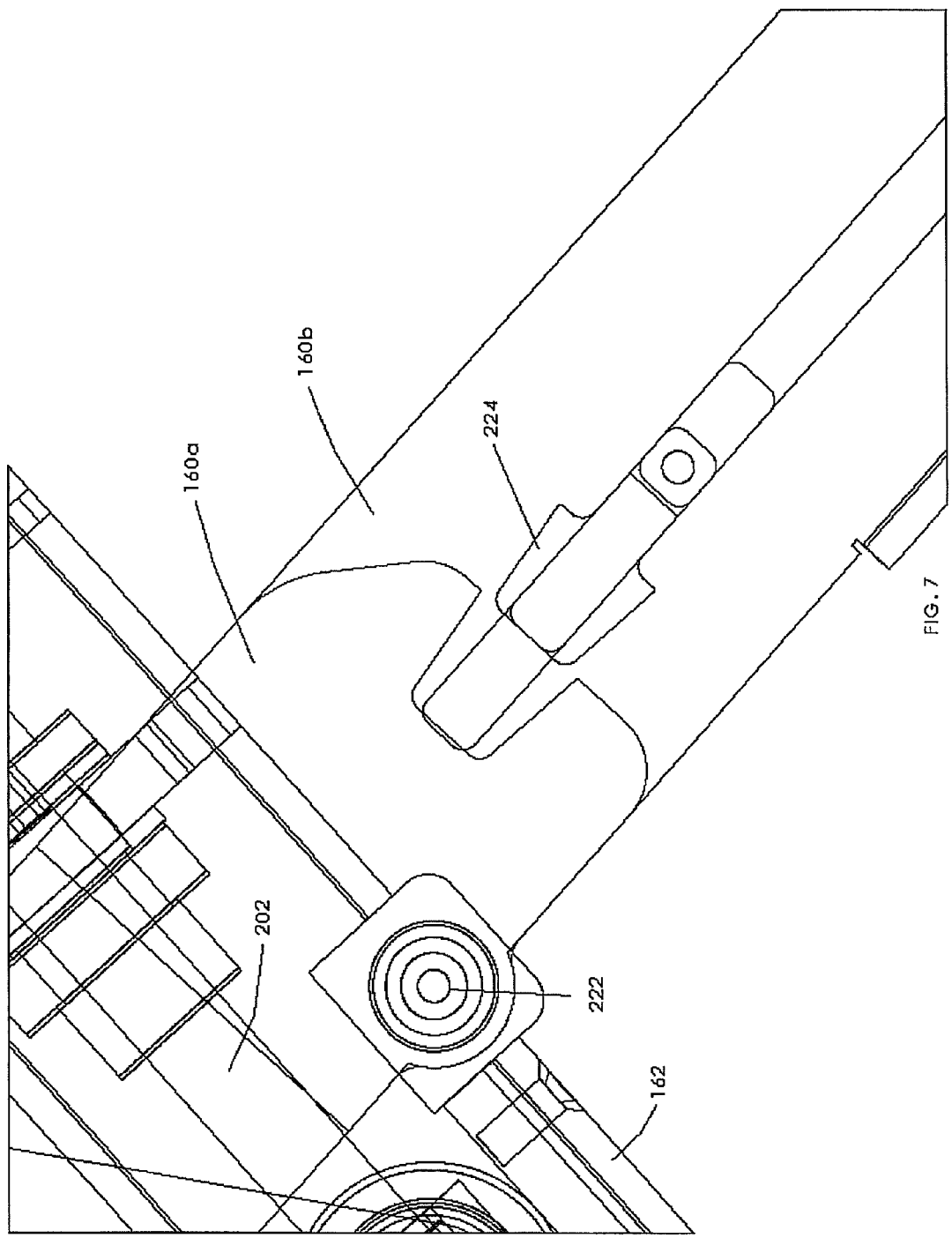
Figure 16:
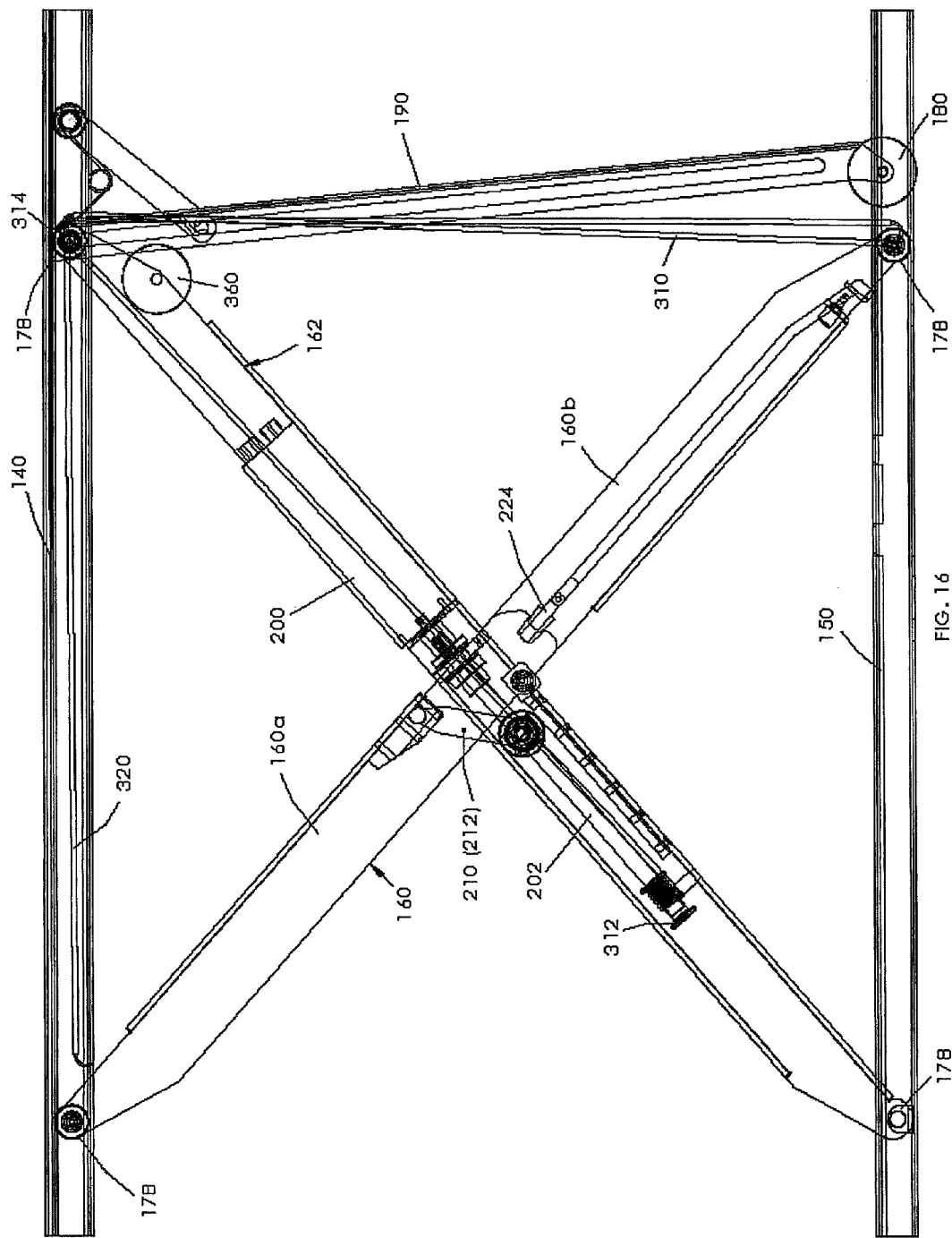
Figure 18:
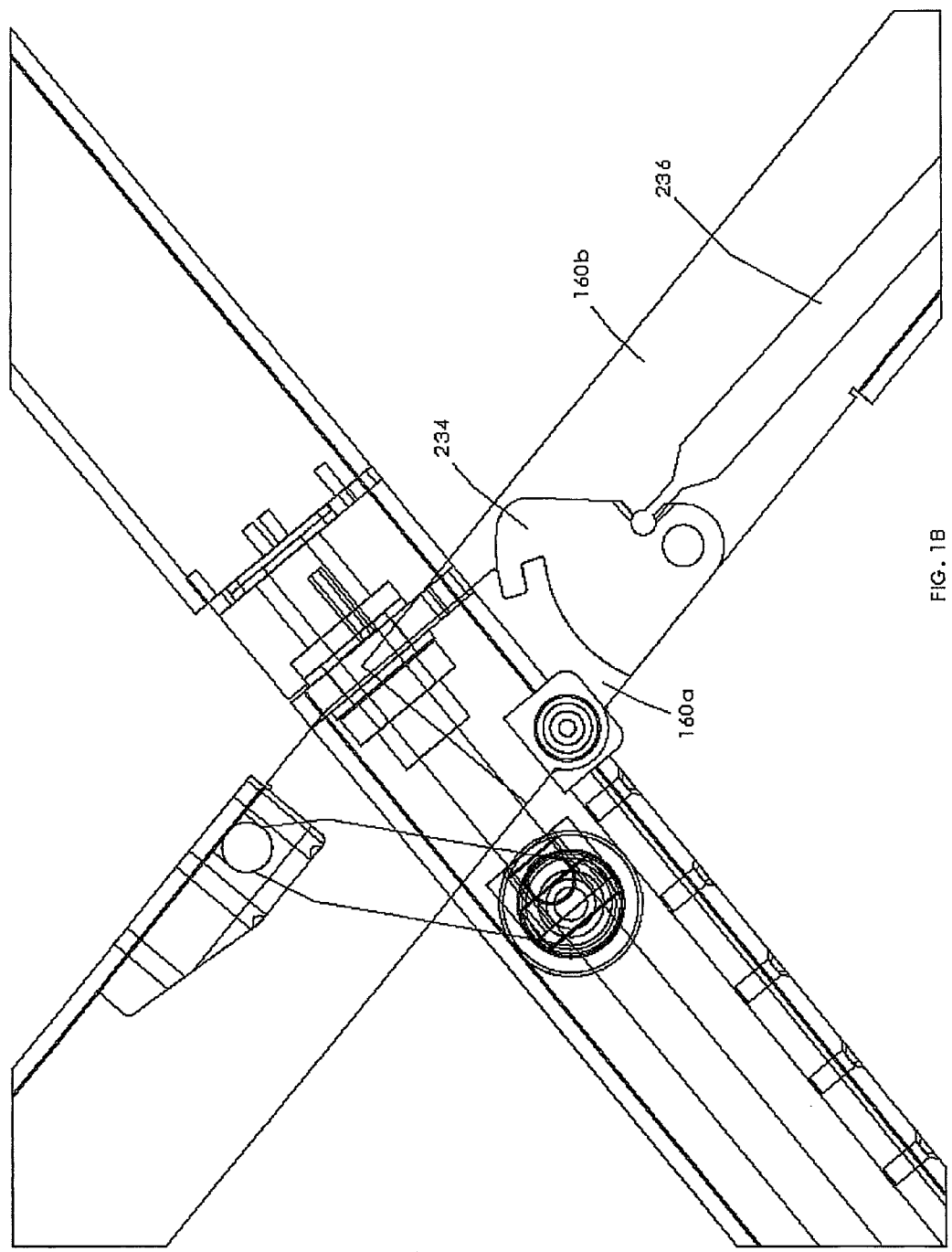
Figure 19:
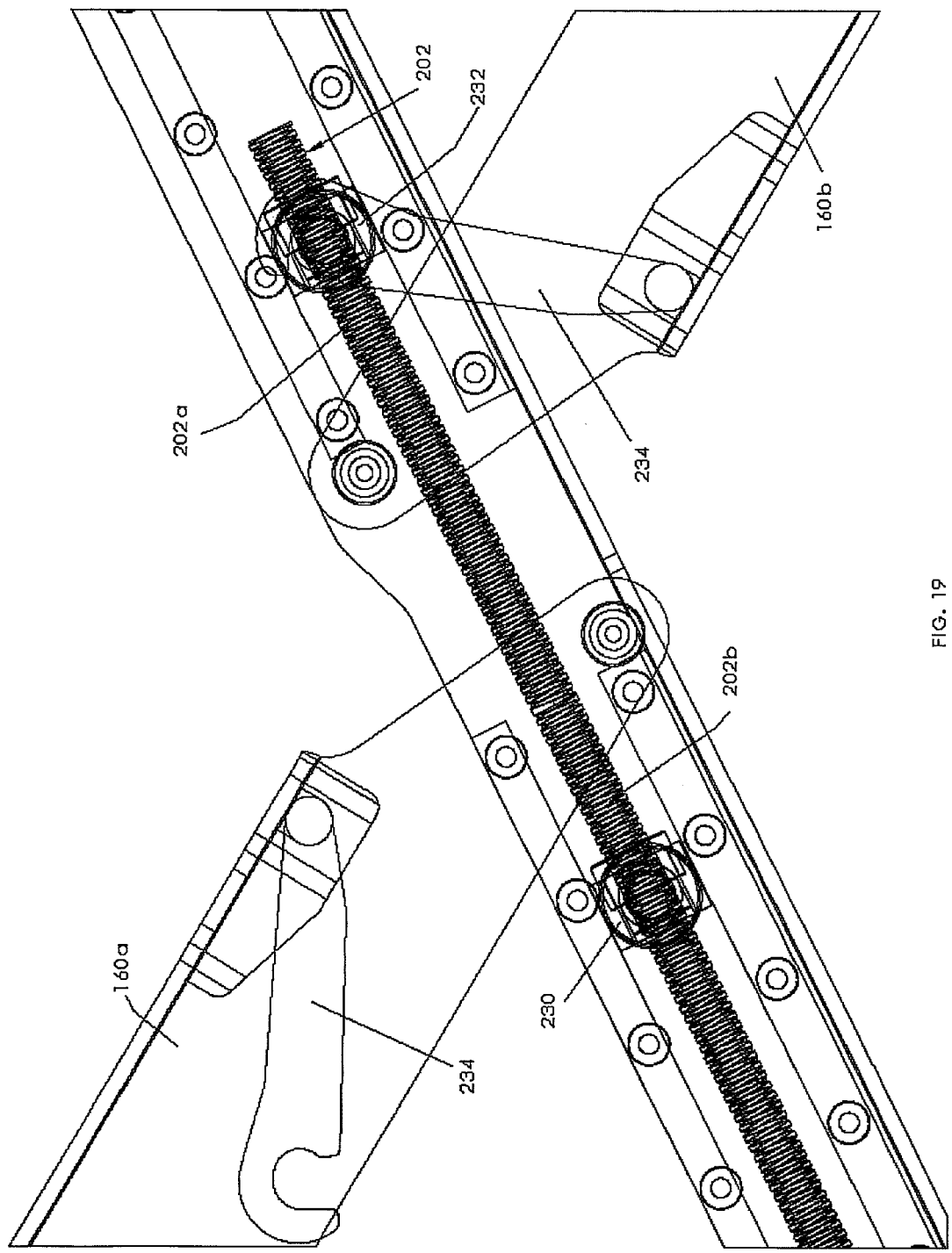

Typically, a scissors-type lift has two legs of approximately the same length with a pivot point in the approximate center of each leg. However, the present arrangement is different. Here, one leg 162 of each lift is typical, while the other leg 160 is designed as two half-length pieces 160*a*, 160*b* with hinge points 222 on their mating ends. For normal up and down lifting, the two half legs 160*a*, 160*b* are locked in straight alignment with each other via a slide bolt 224 so the half legs will act as a single leg (FIGS. 7 and 16). When the slide bolts 224 are retracted, the shorter leg that is connected to the drive screw 202 can pivot around the center axis independent of the other short leg. When the lift is in the lowered or nested position, this creates a tilting or angled lift which causes the cargo to slide out or dump (FIG. 8). To have control of each of the upper legs of the scissor lift independently, makes it possible to tilt the lift towards the vehicle so that gravity will cause the carrier 110 to roll into the vehicle cargo area or cargo compartment (FIG. 9), or alternatively for rolling the carrier out of the vehicle or for dumping (FIG. 10). To accomplish this, the drive screw 202 has a first or right-hand pitch thread 202*a*, for example, on one end and an opposite, second or left-hand pitch 202*b* on the other end (FIG. 19). Blocks 230, 232 with links 234 connected to the legs are thereby driven in rails as a result of selective rotation of the drive screw in one direction or the opposite direction. When the motor rotates, the blocks 230, 232 move in opposite directions. In order to operate the legs independently, the links 234 to the blocks 230, 232 can be selectively disconnected (i.e., one of the links 234 disconnected) so only one leg is operated at a time (FIG. 19). The latches or links 234 described above that allow the leg portions 160*a*, 160*b* to move independently of one another to achieve the tilting action of FIGS. 8-10 can be operated manually or by electric solenoids or pneumatic cylinders 236 as represented in FIG. 18.

Figure 11:
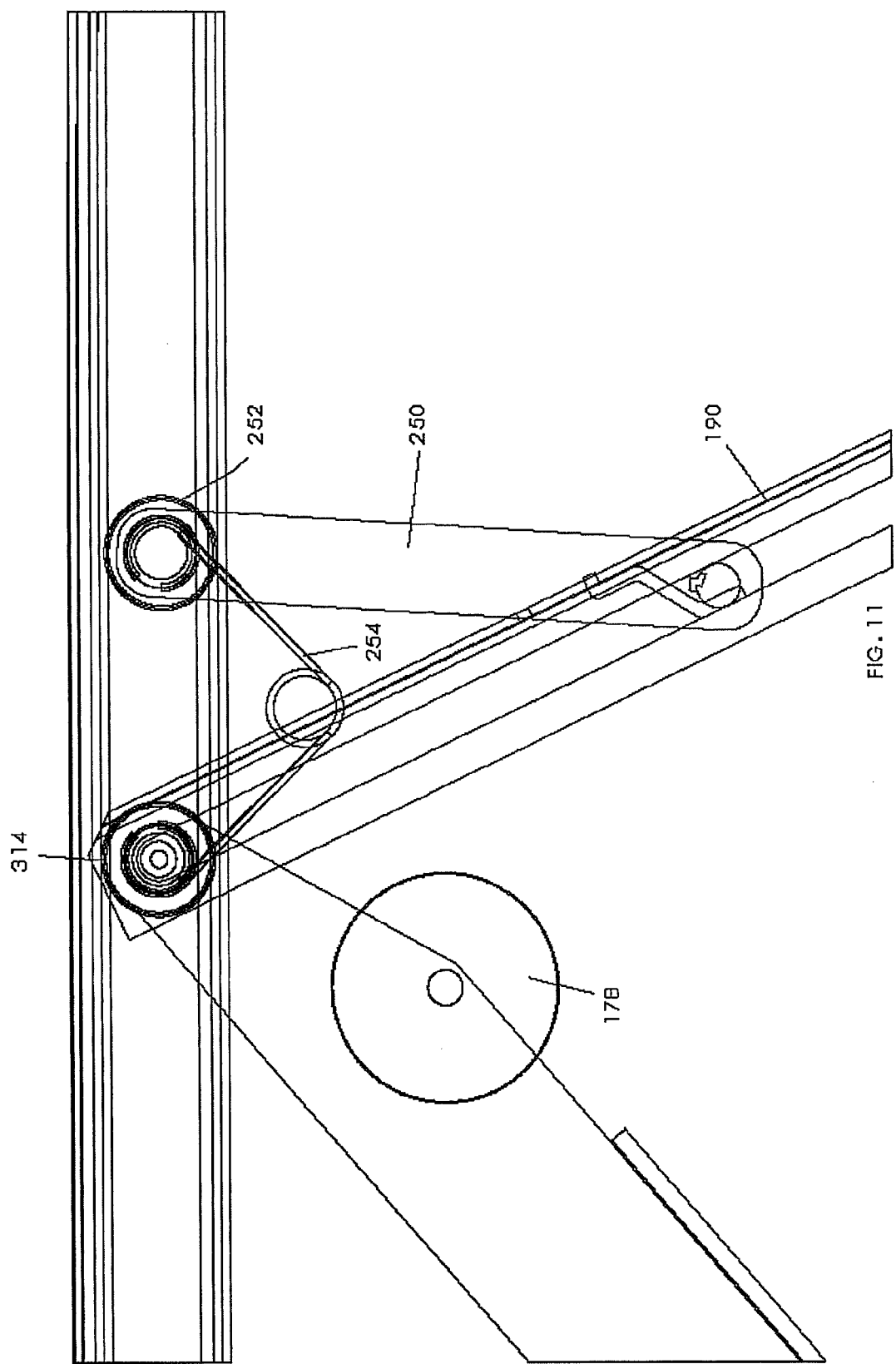
Figure 20:
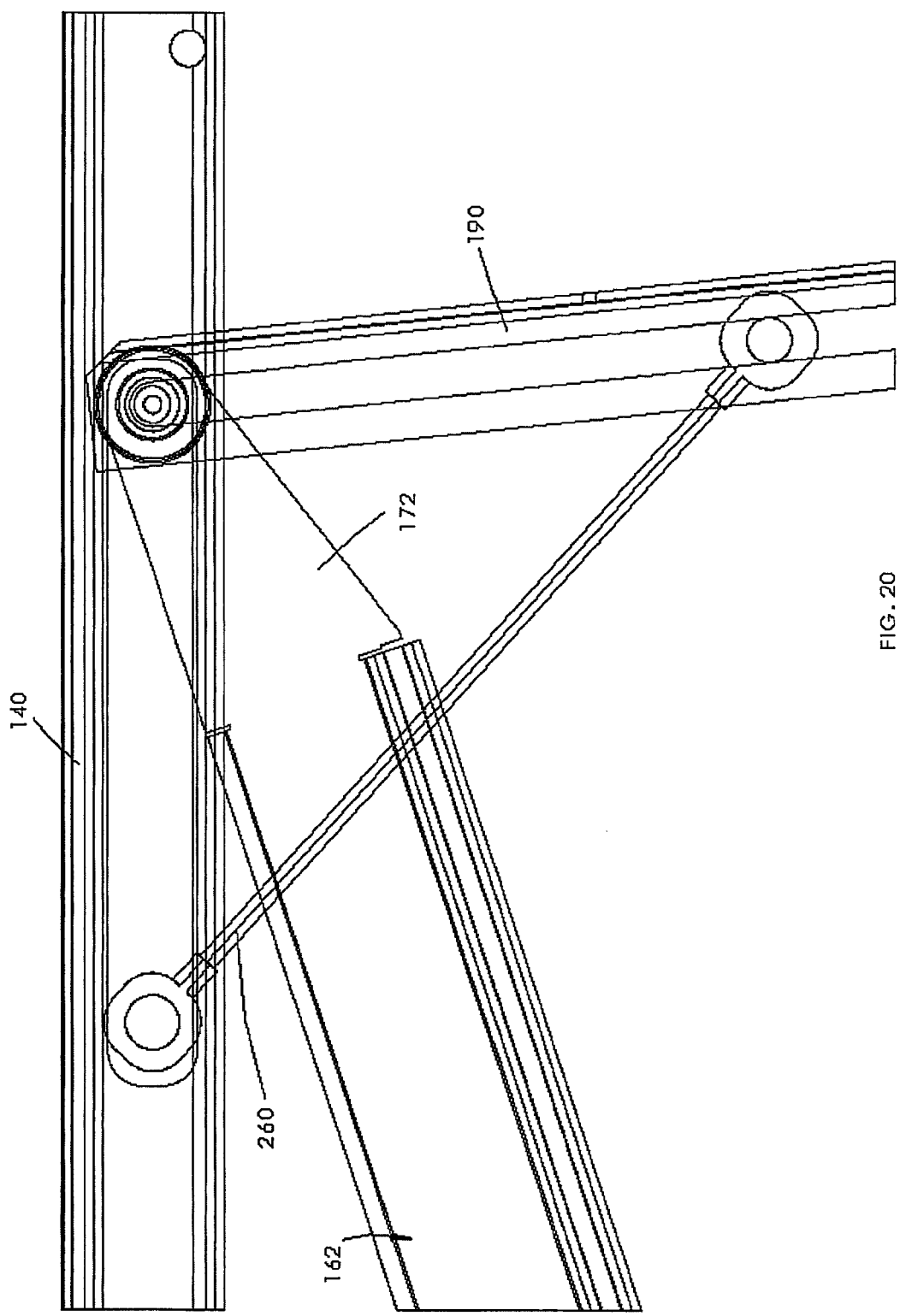

In order to lift the legs to the folded or nested position for storage, the transfer rail 140 is supported on one end by a roller 156 that rests in the truck bed and on the other end by the support leg 190 which is slid out and latched down (FIG. 2). This support leg 190 is stowed in the cavity created by the "U"-shaped channel that forms the legs 160. As shown in FIG. 11, the support leg 190 is slid out and supported by levers 250 that have bearings 252 on the ends and ride in the transfer rail channel 140. Torsion springs 254 force the levers 250 to roll back in the transfer rail channel 140 forming a triangular configuration to support the leg 162. An alternative way of attaching the support leg 190 is to have the top end of the support leg push against the inside of the transfer rail 140 and be held upright by cables 260 that angle from part way down the leg up to the transfer rail (FIG. 20). It is necessary that the support leg 190 be attached to the transfer rail 140 which remains horizontal and not the lifting legs 162, as these legs 162 rotate and change angle as the lift is raised and lowered.

Figure 21:
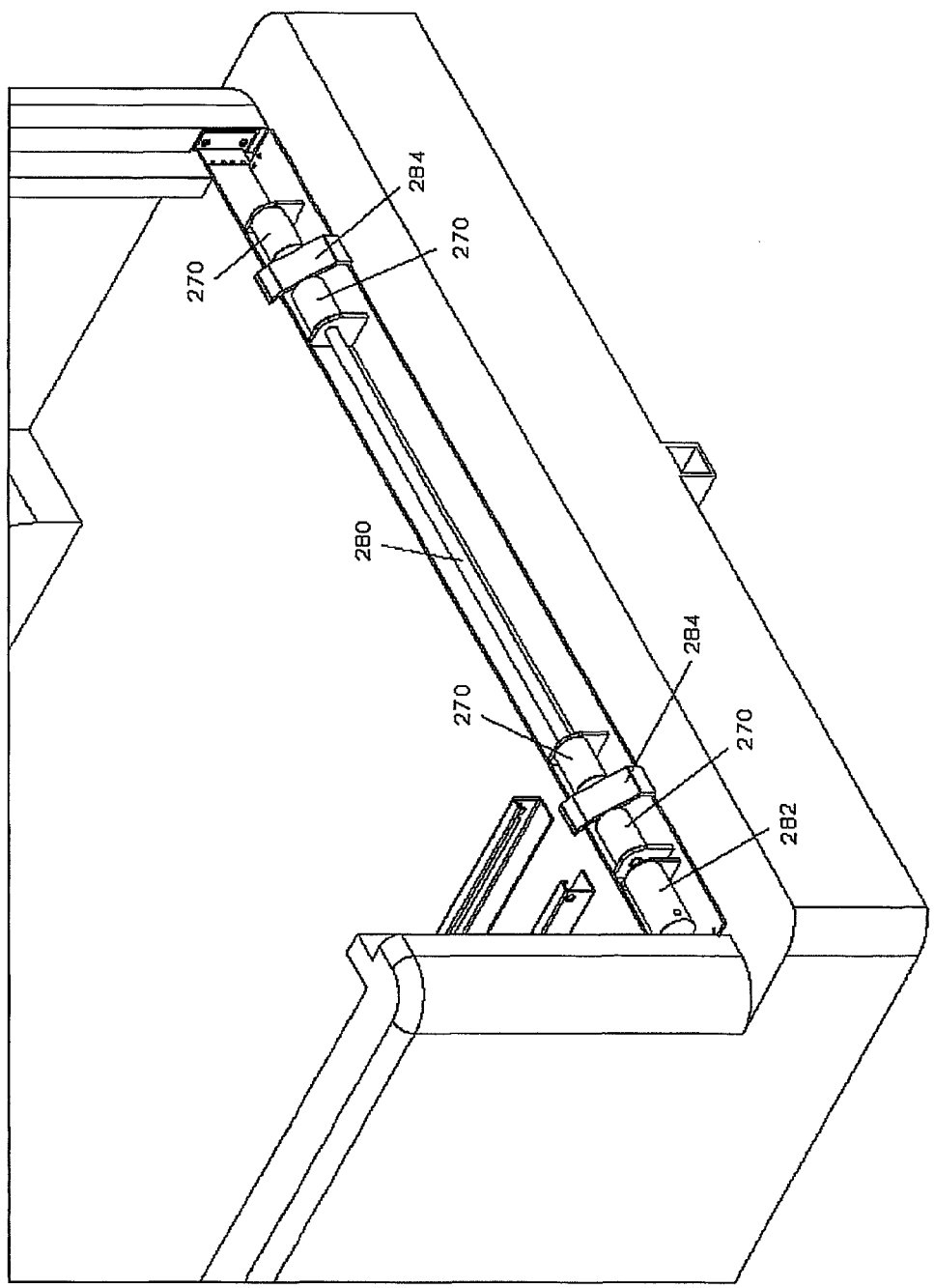
FIGS. 21-29 illustrate additional features of the loading/unloading cargo or carrier system.

To facilitate the stowing of the lift, rollers 156 attached to levers swing down from the tailgate to provide rolling support under the base rail (FIG. 3). An alternative way to assist rolling in the legs is shown in FIG. 21. Rollers 270 are installed on a cross bar 280 which is attached to the pivot points on the tailgate of the vehicle. These rollers 270 can be driven by an electric motor 282 mounted on this crossbar 280 for power rolling in and out of the legs and rails 160, 162, 140, 150, as well as the carrier 110. This crossbar 280 has pivotable latches 284 that selectively pivot to the orientation shown in FIG. 21 where the latches would engage the outward end of the carrier, and particularly a base portion of the carrier, and prevent the legs from being pulled out past the end of the cargo bay of the truck bed (FIG. 21).

The same motors 200 that are used to lift the loaded carrier are preferably used to retract the legs 160 for stowing them below the carrier 110. It may be necessary, however, for the motor gear ratio to be relatively high to lift the heavy load in the carrier, resulting in a longer time period than is desired for just lifting the weight of the legs. A two speed gear head on the motor 200 is impractical so instead first and second acme threaded drive screws of different pitches are used as an alternative means for retracting the legs and stowing them below the carrier. A first or fine pitch screw 300 and a second or course pitch screw 302 are connected by a tube 304 (FIG. 13) that has threaded nuts 306 in each end that correspond to the screw pitches. Under load, physics dictates that a force will take the path of least resistance, and hence the motor 200 will turn the fine pitch screw 300 and the tube 304 when lifting the load. By locking the tube 304, the drive will be switched to the coarse pitch screw 302 which will lift the legs 160, 162 for storage much quicker.

An alternative way of raising the legs is by using cables 310 (wire rope) (FIG. 16). A spool 312 on the drive screw 202 could wind in a cable 310 that is routed by pulleys 314 to one end of the lower leg ends, so that winding in the cable raises the legs 160, 162. Reversing the motor 200 would allow gravity to lower the legs. Cables 320 could be used to pull the carrier 110 in and out of the vehicle and could also be used to pull the nested lift 130 in and out of the carrier recesses 142, and to also raise and lower the support leg 190. Yet another way of moving the carrier in and out of the vehicle is by using telescoping threaded drive screws.

Figure 14:
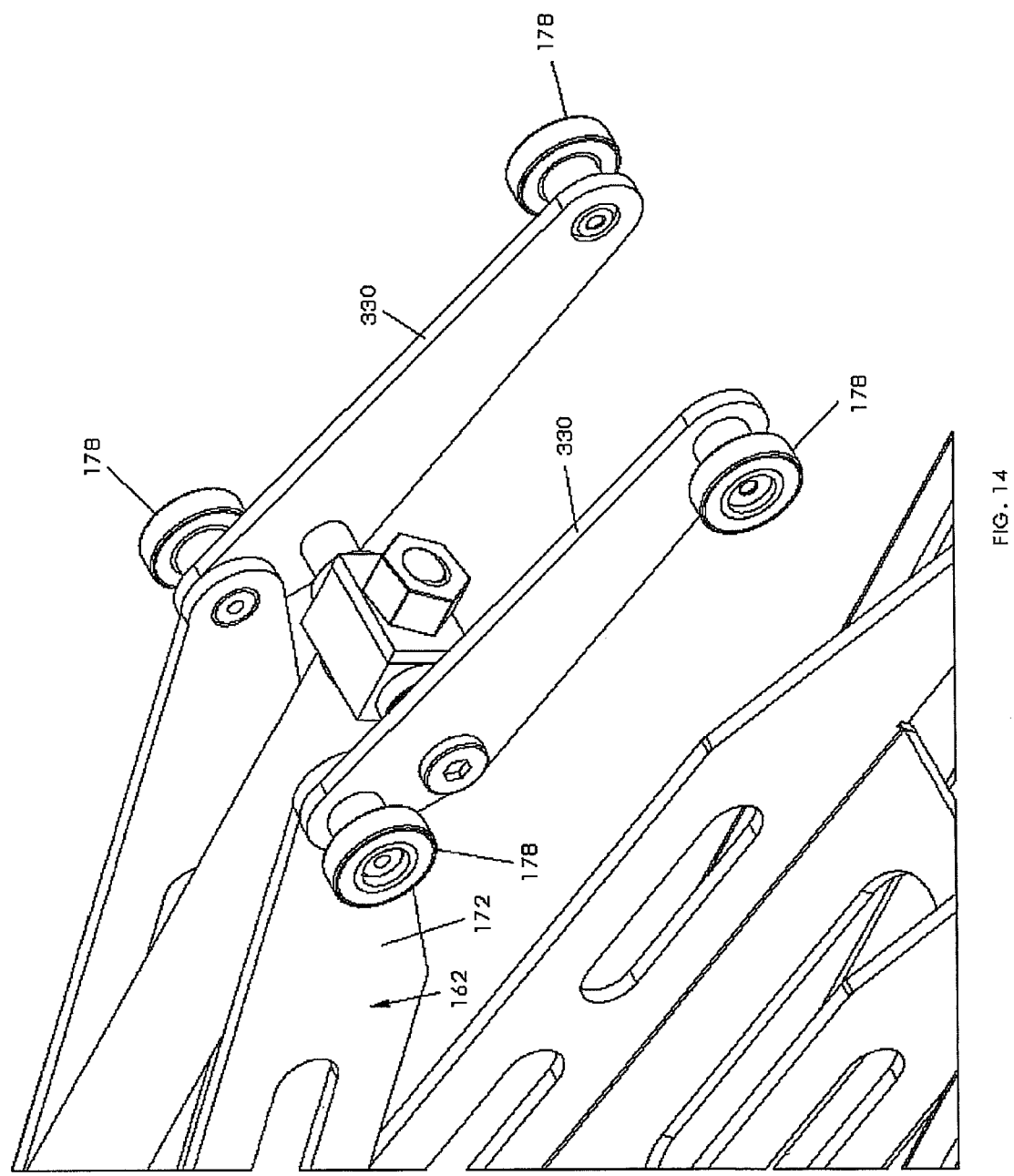

When the lift 130 is in the lowered or nested position there is poor mechanical advantage for the drive screw 202 to lift, hence levers 330 can be added to the ends of the upper scissor legs 162 that are rotated by the motor 200 and drive screw 202 and give the mechanical advantage needed to initiate the first few inches of lift (FIG. 14).

Figure 15:
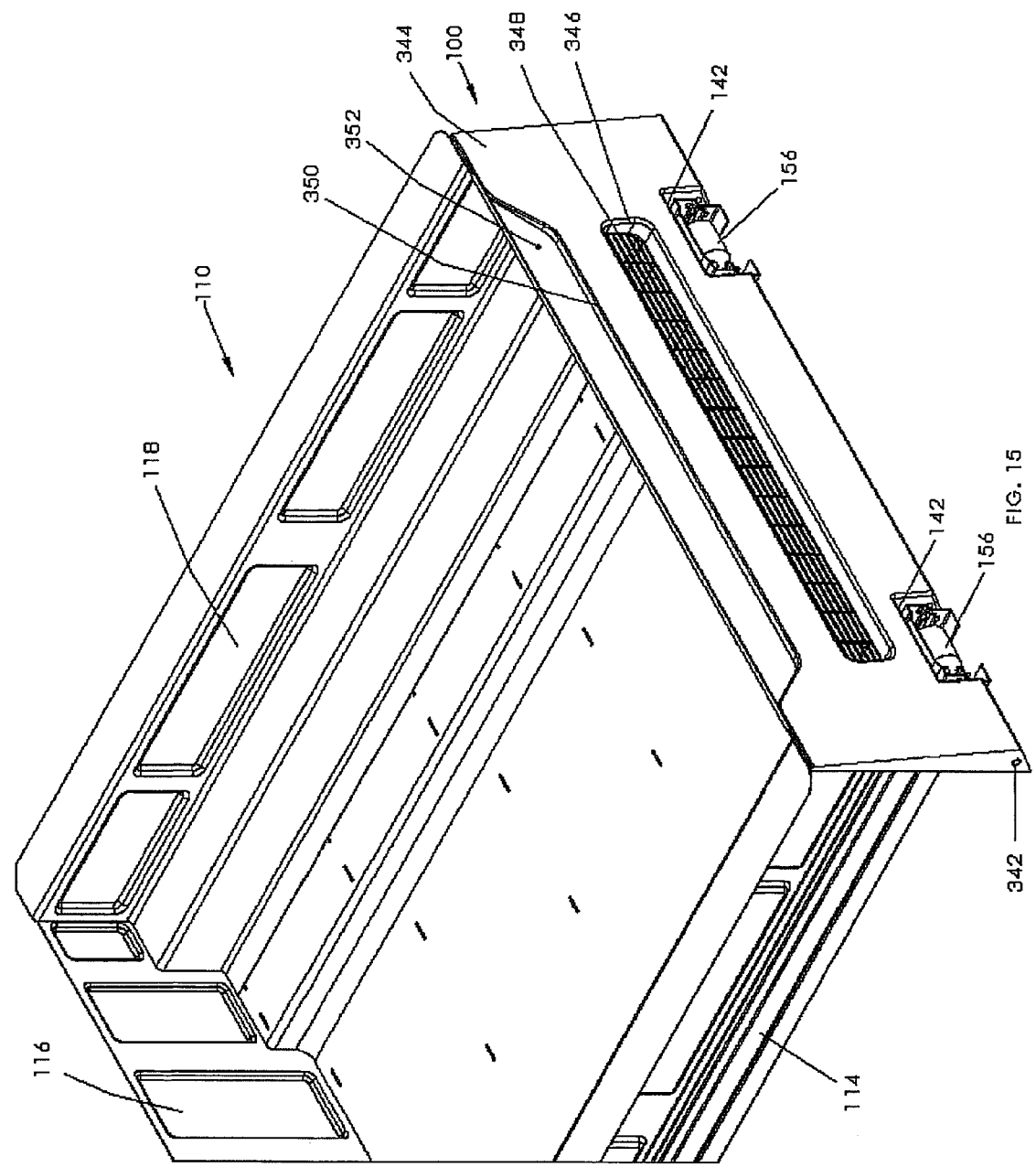

For pick-up truck applications the original tailgate is removed from the truck. An improved tailgate 340 is attached to the rear of each carrier 110 (FIG. 15). The tailgate 340 preferably has a hinge 342 at the bottom and is thinner at the top 344 so the tailgate can be used as a ramp for loading cargo onto the carrier 110. The tailgate 340 of this embodiment latches to the manufacturer original latch points locking the carrier 110 into the truck, or alternatively the tailgate can latch to the carrier. A lower portion of the tailgate 340 has an opening or window 346 to enhance the truck driver's view out the rear while backing in close proximity to other objects. This opening 346 is covered with a wire mesh screen 348 to contain cargo in the carrier 110. An upper portion of the tailgate 340 is cut down in the center 350 to further enhance the driver's view to the rear. A separate piece 352 can be installed in the upper opening to better contain cargo in the truck bed.

Figure 17:
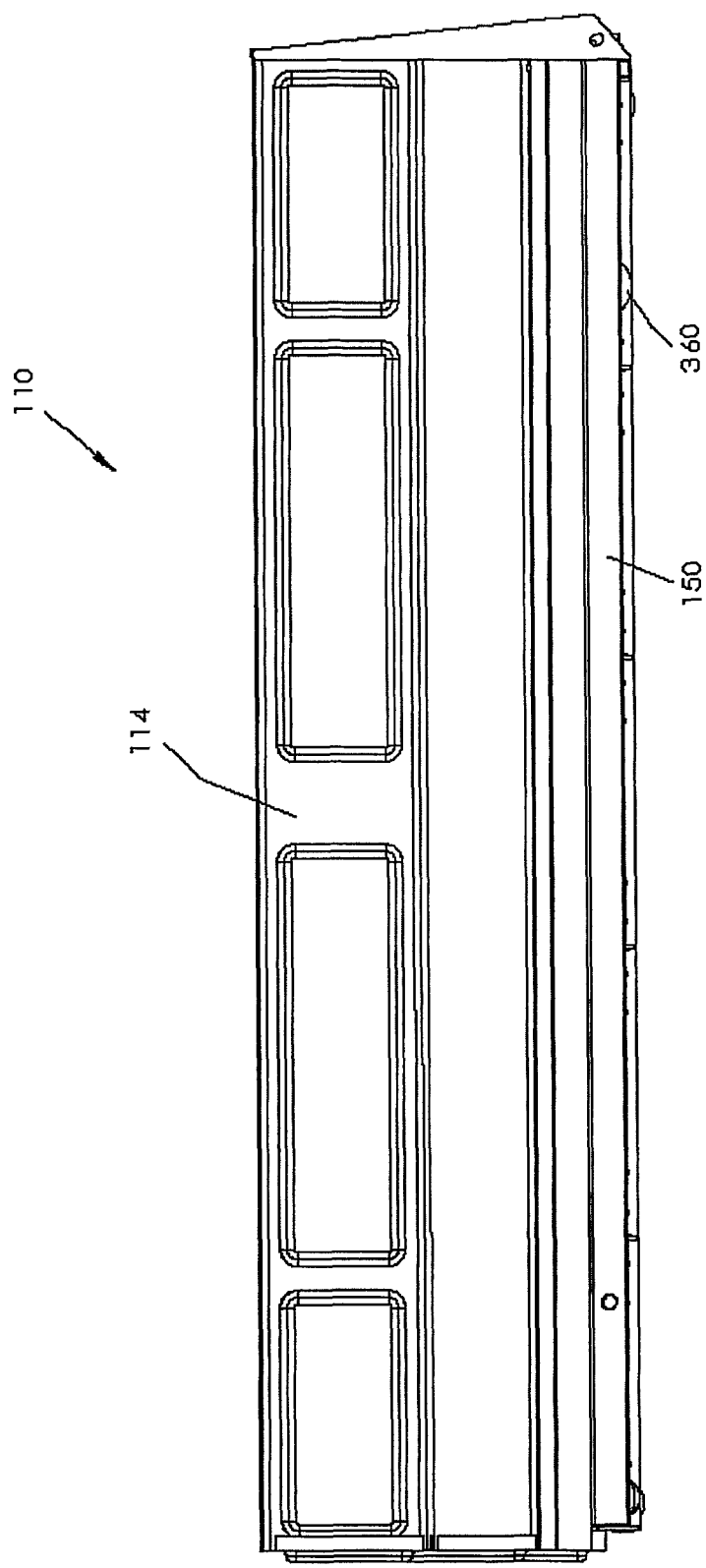

When the lift 130 is in the lowered position, wheels 360, which are mounted in the leg channels, contact the ground and allow the carrier 110 and lift mechanism 130 to be rolled on the ground (FIG. 17). Raising the lift 130 raises the wheels 360 so that the base rail 150 makes firm contact with the ground.

Figure 22:
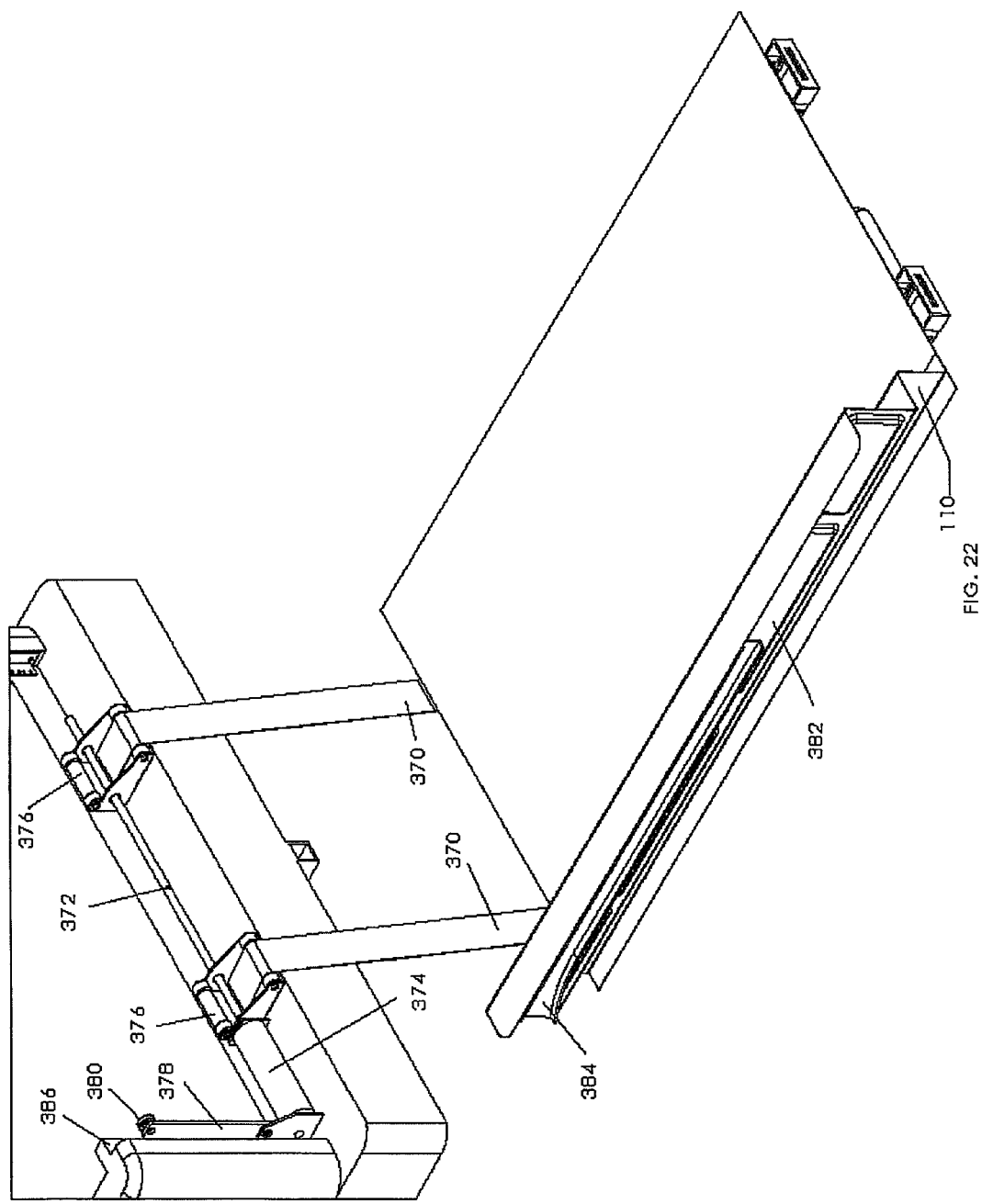
Figure 23:
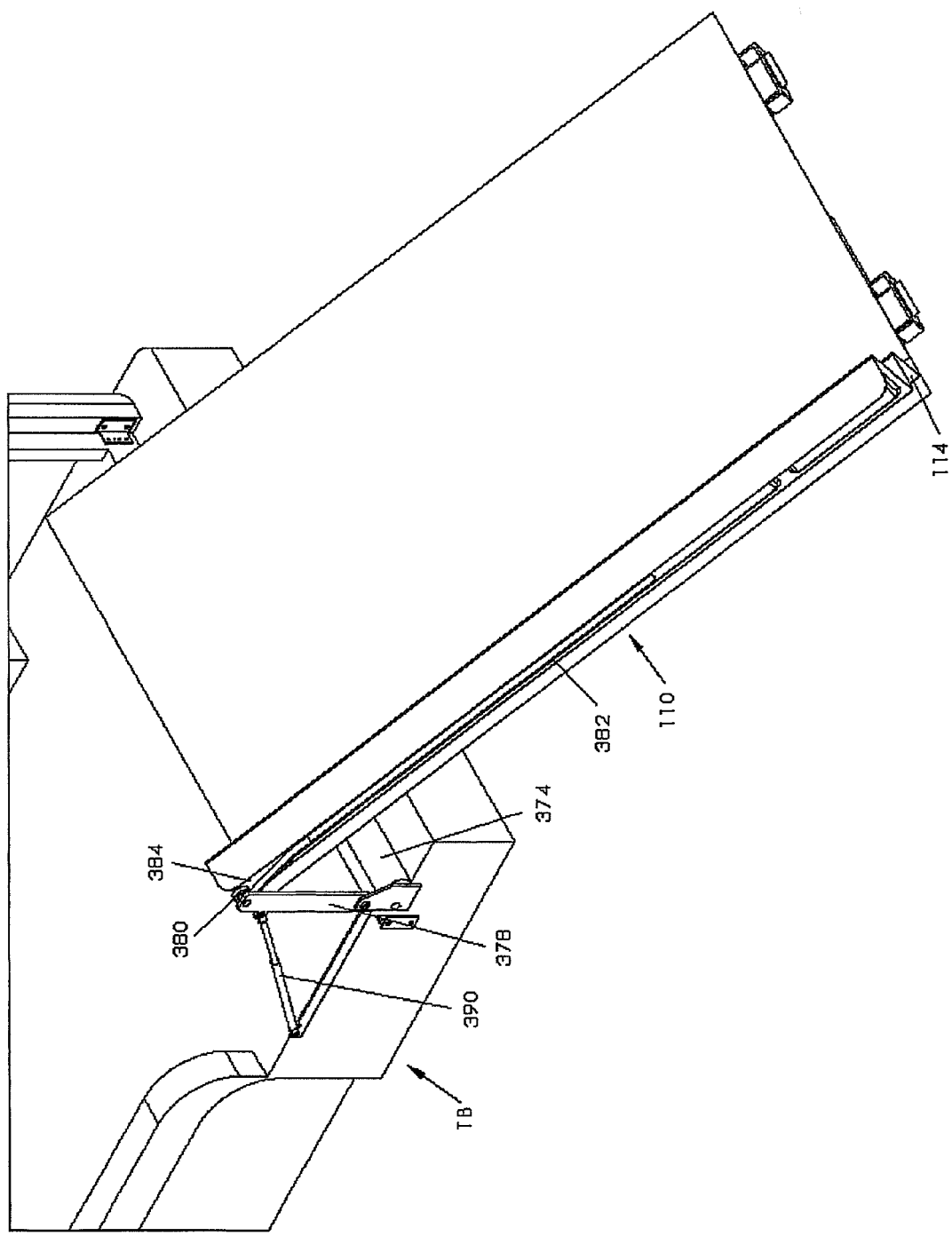

An alternative way of loading the carrier 110 into the vehicle is by pulling it up and in to the cargo bay with straps 370 (FIGS. 22-23). A cross bar 372 similar to the one described in FIG. 21 is secured to the vehicle but employs a more powerful motor 374 and drives spools 376 with straps attached to them. The other ends of these straps 370 are routed under the carrier 110 and are attached to the rear of the carrier. As these straps 370 are wound in, the front of the carrier 110 is lifted up to the height of the rollers. At this point levers 378 which have rollers 380 on the ends of them engage a rail or channel 382 which has a wide or enlarged mouth end 384 on the side of the carrier. These levers 378 have a stop mechanism 386 to prevent them from rotating away from the truck. This mechanism prevents the carrier 110 from rotating to a vertical position and ensures that the carrier will be pulled up at an angle. When the center of gravity or pivot point of the carrier 110 reaches the rollers 380, gravity will urge the carrier to a horizontal orientation and the carrier will continue to be pulled into the cargo bay by the straps 370. Air struts or torsion springs 390 (FIG. 23) prevent the carrier from dropping too rapidly after it reaches the pivot point.

Figure 25:
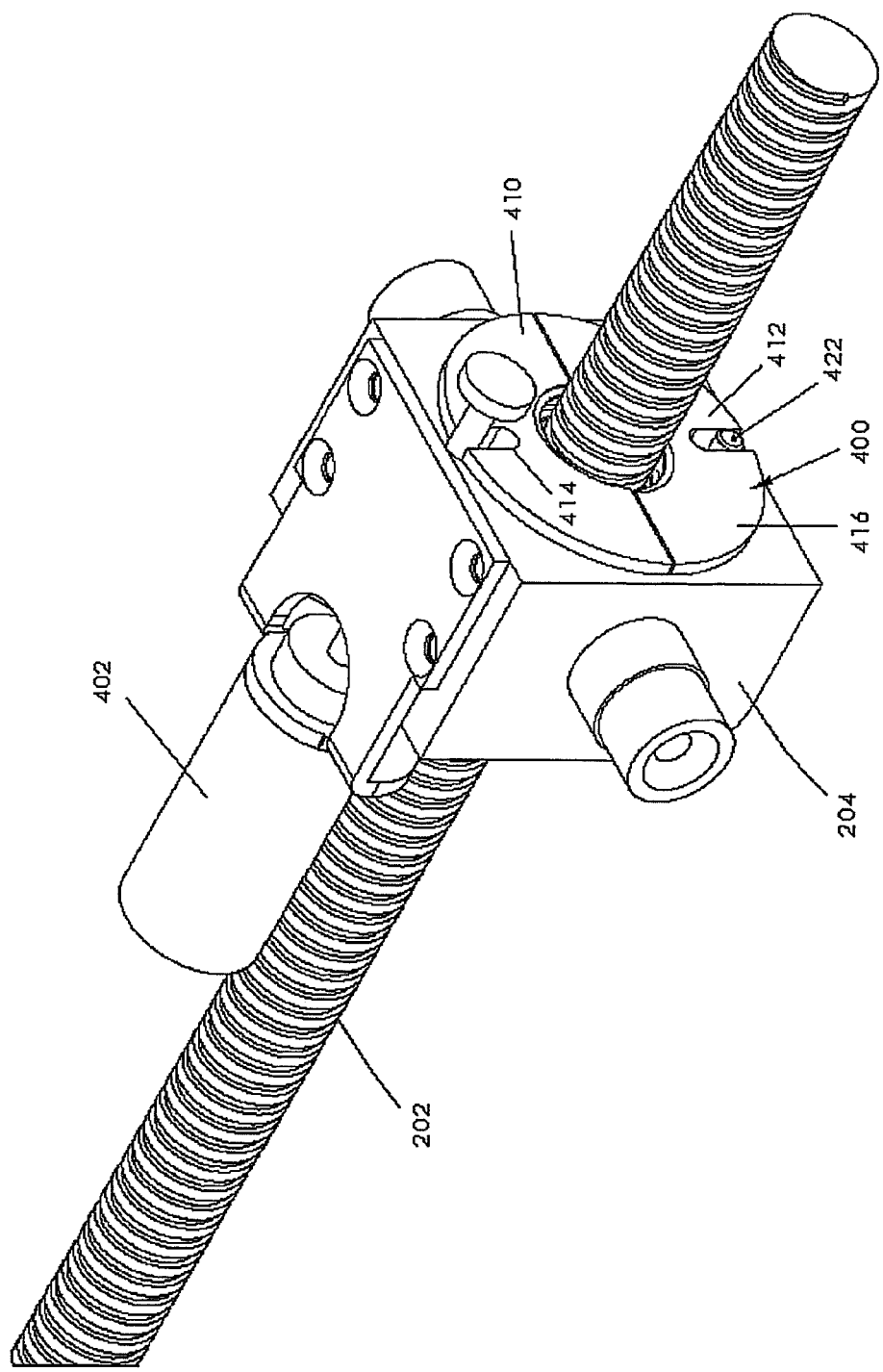
Figure 26:
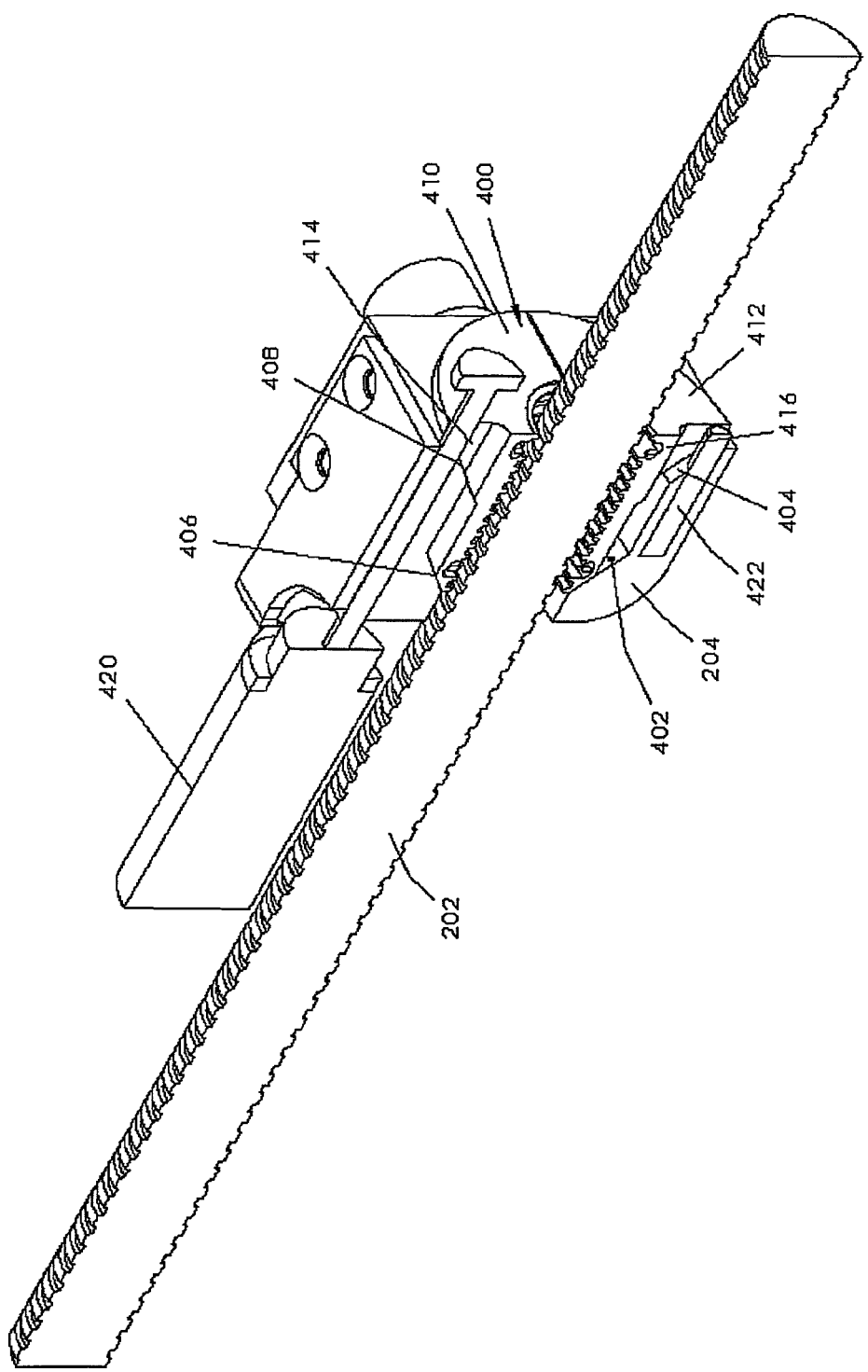

With reference again to FIG. 19 and the selectively disconnecting links that allow the half legs 160a, 160b to articulate independent of each other and independent to the long straight leg 162, another embodiment is shown in the FIGS. 25 and 26. Instead of the links disconnecting, a split nut 400 internal to drive block 204 selectively engages and disengages drive screw 202. There are two tapers 402, 404 inside the drive block that match tapers 406, 408 on the split nut 400 so that when the split nut halves are pushed into the block, the split nut halves clamp down around the drive screw 202. This assembly is installed in the proper direction so that when there is a load on the drive block via the links 234 due to the load in the carrier, the split nut halves 400 are forced into the block 204 and cannot separate. When there is no load on the block and the drive screw is turned in the opposite direction, the arrangement pushes the split nut halves out of the block and hence the split nut halves disengage from the drive screw. There are two expansion rings 410, 412, one on each end of the split nut, that assure the nut will separate far enough so the threads don't drag on the drive screw (see cutaway in FIG. 26 where the grooves 414, 416 are provided for the expansion rings). A solenoid 420 is activated to urge the split nut back into the block as the drive screw is turned in the forward direction. A pin is pressed into the block 204 and extends through the split nut halves to prevent the split nut halves from turning.

Figure 27:
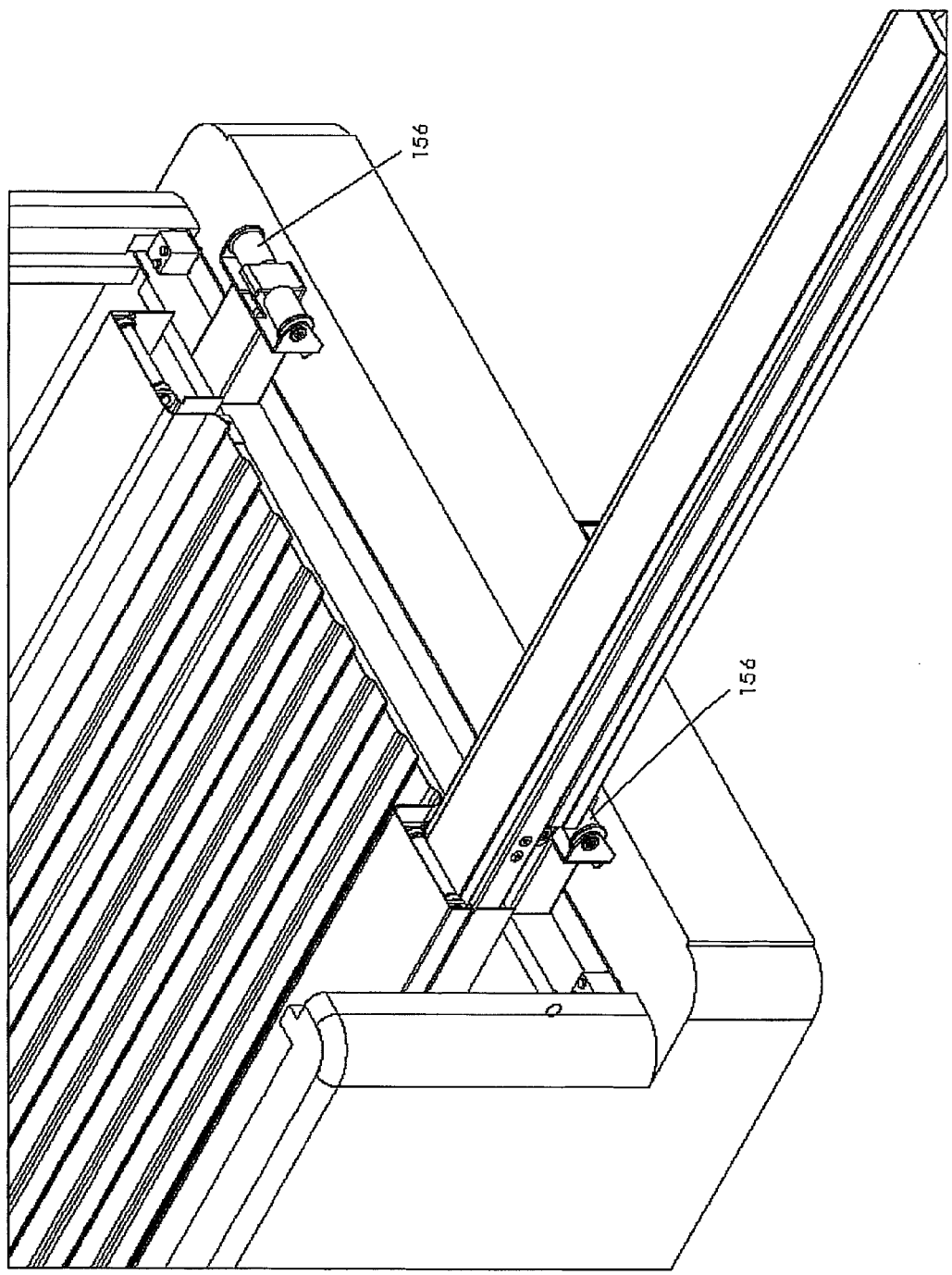
Figure 28:
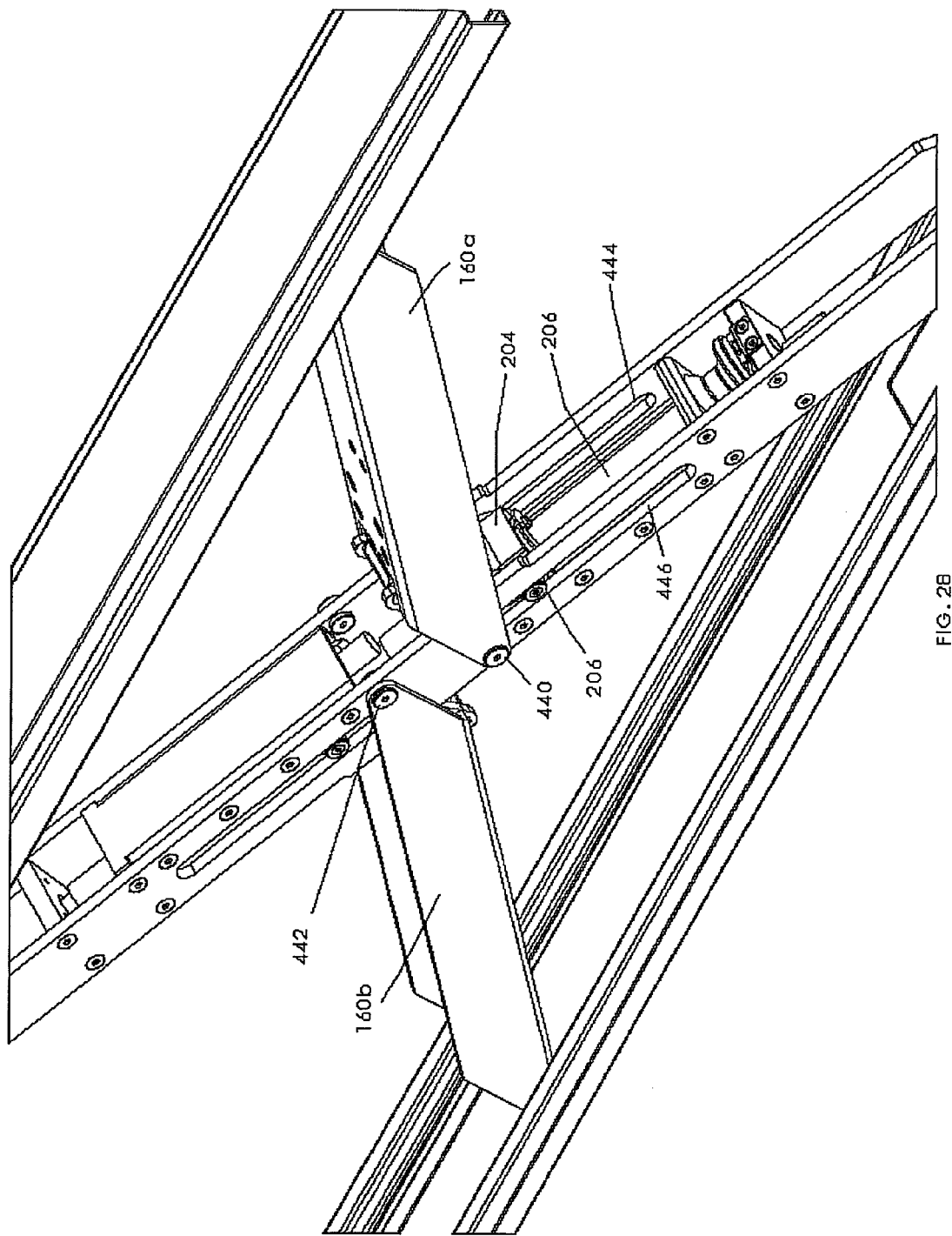

Now with reference to FIG. 2 and the support leg 190, an alternative design eliminates this support leg 190 by cantilevering the transfer rail 140 out from the truck (FIG. 27). A second support wheel is added to the transfer rail at a predetermined dimension (e.g., about 17 inches back) from the front. When the transfer rail is pushed in part way (17 inches), this second support wheel is supported by the cross rail 280 (FIG. 21). The roller on the front of the transfer rail pushes up under the carrier 110 that has already been rolled into the truck creating the support to cantilever the transfer rail 140 while the lift legs are raised to the nested position.

In another embodiment (FIG. 28), two short legs 160a, 160b no longer have a common hinge point as described in connection with FIGS. 7 and 16. Instead each leg 160a, 160b has its own hinge point 440, 442 spaced apart from one another. The legs 160a, 160b and 162 function exactly as previously described, however, the legs 160a, 160b do not have to overlap. This allows the leg portions 160a, 160b to be identical parts reducing production costs and the lift is slightly narrower where space is crucial.

The longer leg need no longer be a folded metal beam as described above. Rather, and referring to FIG. 28, ideally this leg portion would be folded with the "U" facing down on the top end 160a and with the "U" facing up on the bottom end 160b. However, since this is not possible, two flat sides are used with two folded supports bolted across them located in the ideal location described above.

Again referring to FIG. 28, the drive block bearings 206 no longer travel in track 208 but in slots 444, 446 cut into the long leg.

Figure 29:
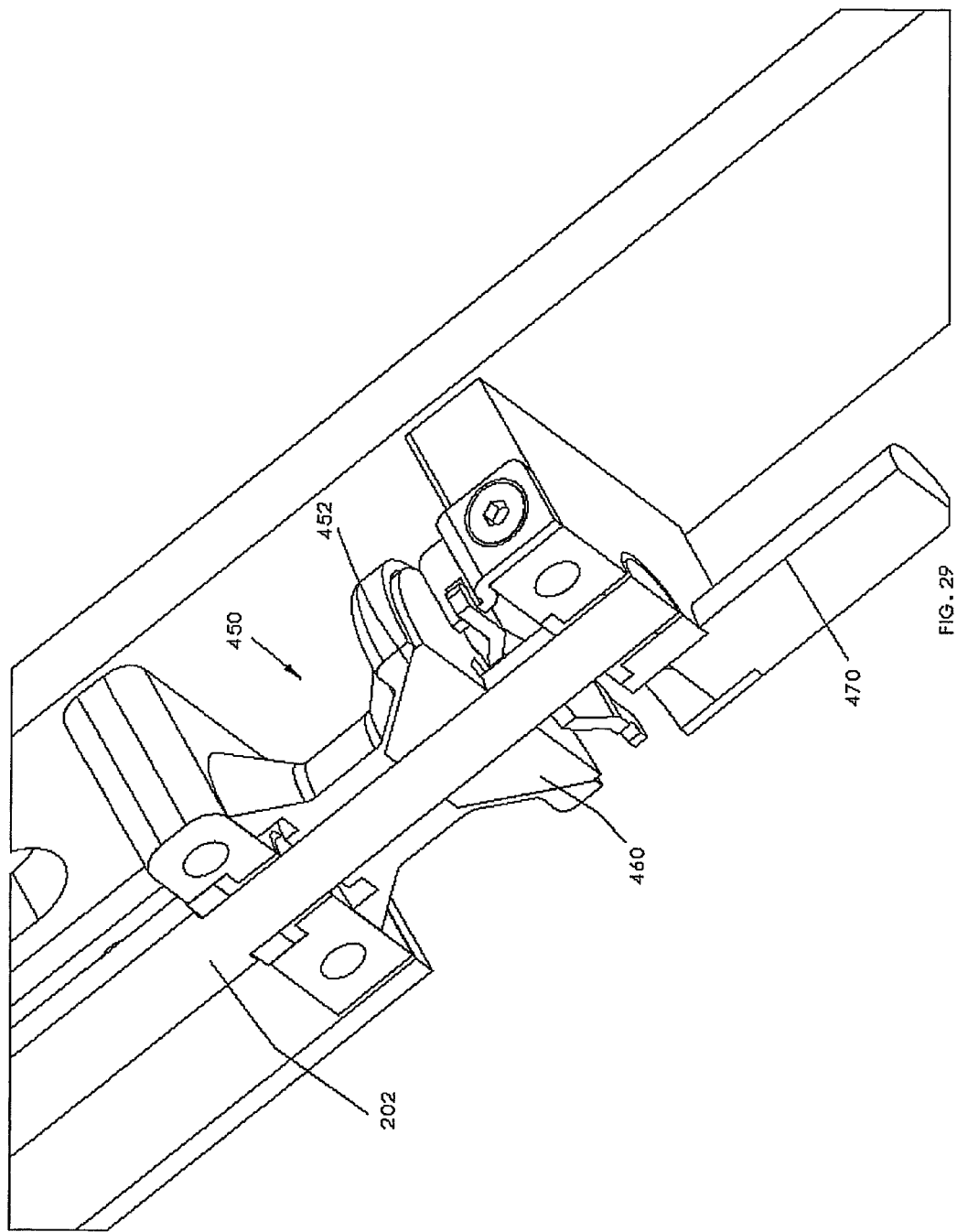

The legs will preferably be raised by cables as described above in connection with FIG. 16. To do this, the spool 312 needs to selectively engage and disengage and needs to have a means to take up the slack in the cable when the lift raises and lowers when the spool is disengaged. FIG. 29 shows a clutch mechanism which includes a spool 450 that is mounted on the end of the drive screw 202 but can rotate freely on the non-threaded end of it. It has a tapered recess 452 in one end. A tapered cone 460 that is mounted on the same drive screw but is driven by the drive screw with a key and keyway arrangement that can selectively slide back and forth on the shaft to engage the spool such that when it is engaged into the spool, it drives the spool to rotate. The outer surface of the cone could have serrations or a rubber material bonded on it to help create the friction necessary to drive the spool. A solenoid slides 470 the spool 460 back and forth to engage and disengage it. On the other end of the spool there is a counter bore or recess to provide a space for a constant force spring that takes up the slack in the cable.

Figure 30:
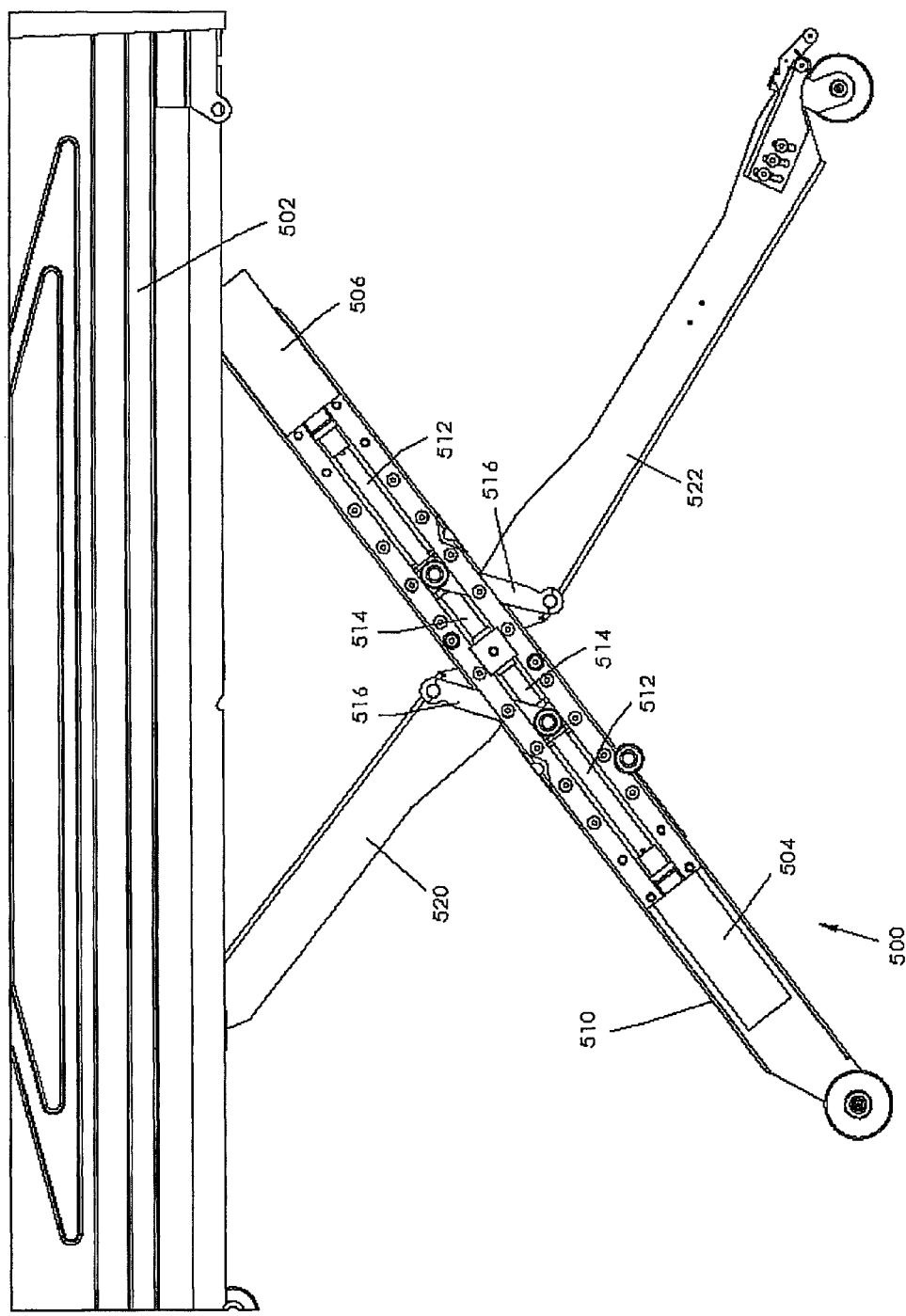
FIGS. 30-37 show an arrangement that uses two motors in a leg for selectively manipulating leg portions of the other leg to raise, lower, tilt, nest, etc. the carrier.

FIG. 30 shows another lift design 500 that moves a carrier 502 in and out of an associated truck bed (not shown). In this particular embodiment, first and second motors 504, 506 are mounted in each long leg 510 (only one of the long legs illustrated in FIG. 30). Each motor 504, 506 powers a separate drive screw 512 which includes a drive block 514 of the type described, for example, with respect to the embodiment of FIG. 12. Here, however, mechanical links 516 interconnect the first leg 510 with a respective second leg portion 520, 522. In this embodiment, the mechanical links are no longer required to be selectively detachable from second leg portion 520 or second leg portion 522 since each second leg portion 520, 522 can be driven up or down independently without affecting the other. Independent operation of the first and second motors 504, 506 alters a relative angle between the first leg 510 and one of the associated second leg portions 520, 522 through the connection of the separate mechanical links 516 with the respective second leg portions 520, 522. This allows the operator/user to control a level of the carrier 502 both front to back, as well as side to side due to the independent operation of each of the first and second motors 504, 506 in each pair of first and second legs. That is, the independent operation of each of the first motors 504 and/or each of the second motors 506 will allow the side to side manipulation of the carrier. The angle between the first leg 510 and one of the shorter, second leg portions 520 is altered by operating the first motor 504, and in a similar fashion the angle between the other end of the first leg 510 and the second of the shorter, second leg portions 522 is altered by operating the second motor 506. Of course, if desired, both of the first and second motors 504, 506 (or all four motors—two in each first leg) may be simultaneously operated so that the second leg portions 520, 522 maintain a substantially linear relation relative to one another and pivot as a single leg relative to the first leg 510.

Figure 31:
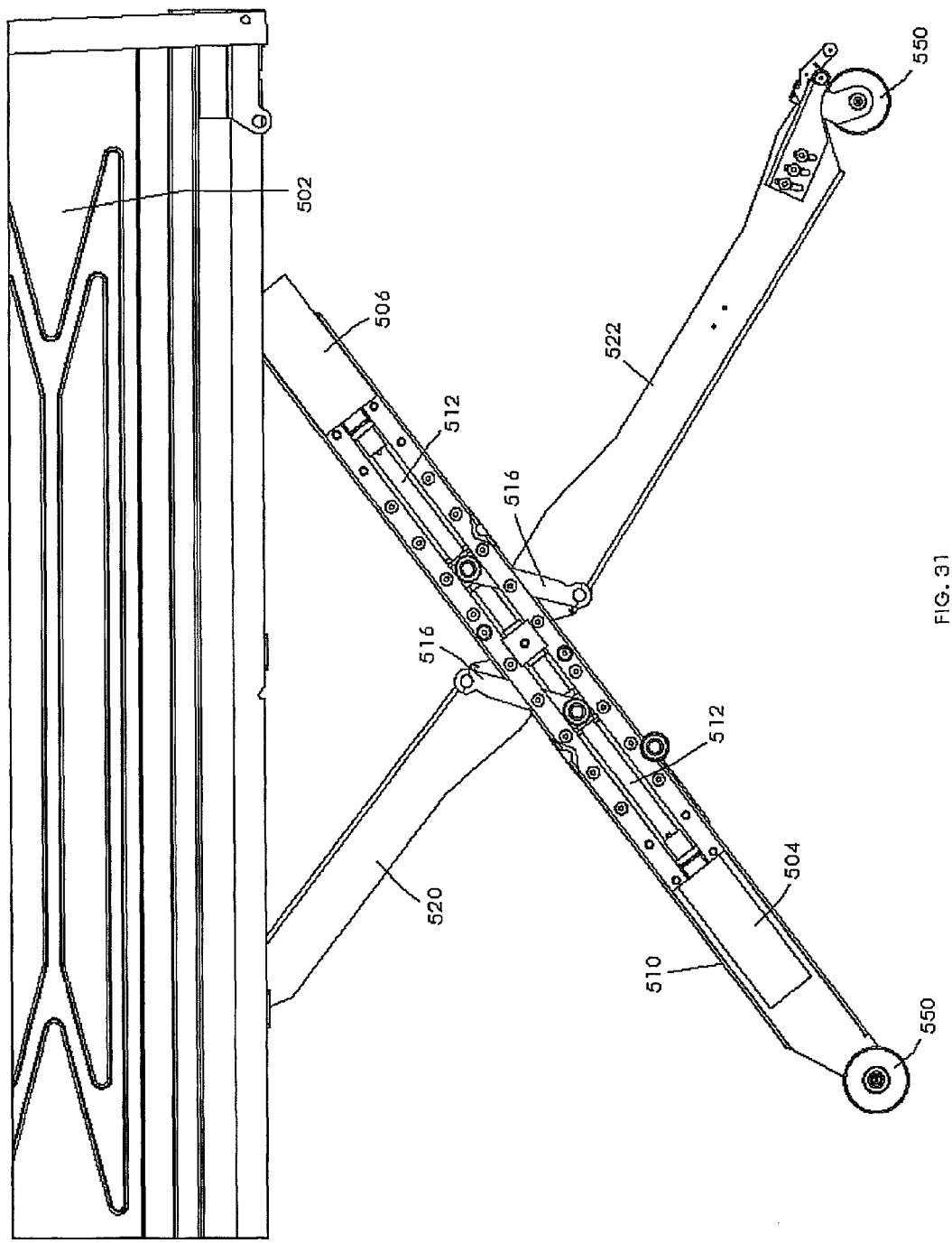

FIG. 31 emphasizes a design in which a base rail has been eliminated. Instead, enlarged rollers or wheels 550 are provided at first or distal ends of each of the first legs 510 and the second leg portions 522. The enlarged rollers 550 allow the lift mechanism 500 to freely move about on an associated ground surface and be advantageously positioned behind a vehicle or truck for loading and unloading purposes.

Figure 32:
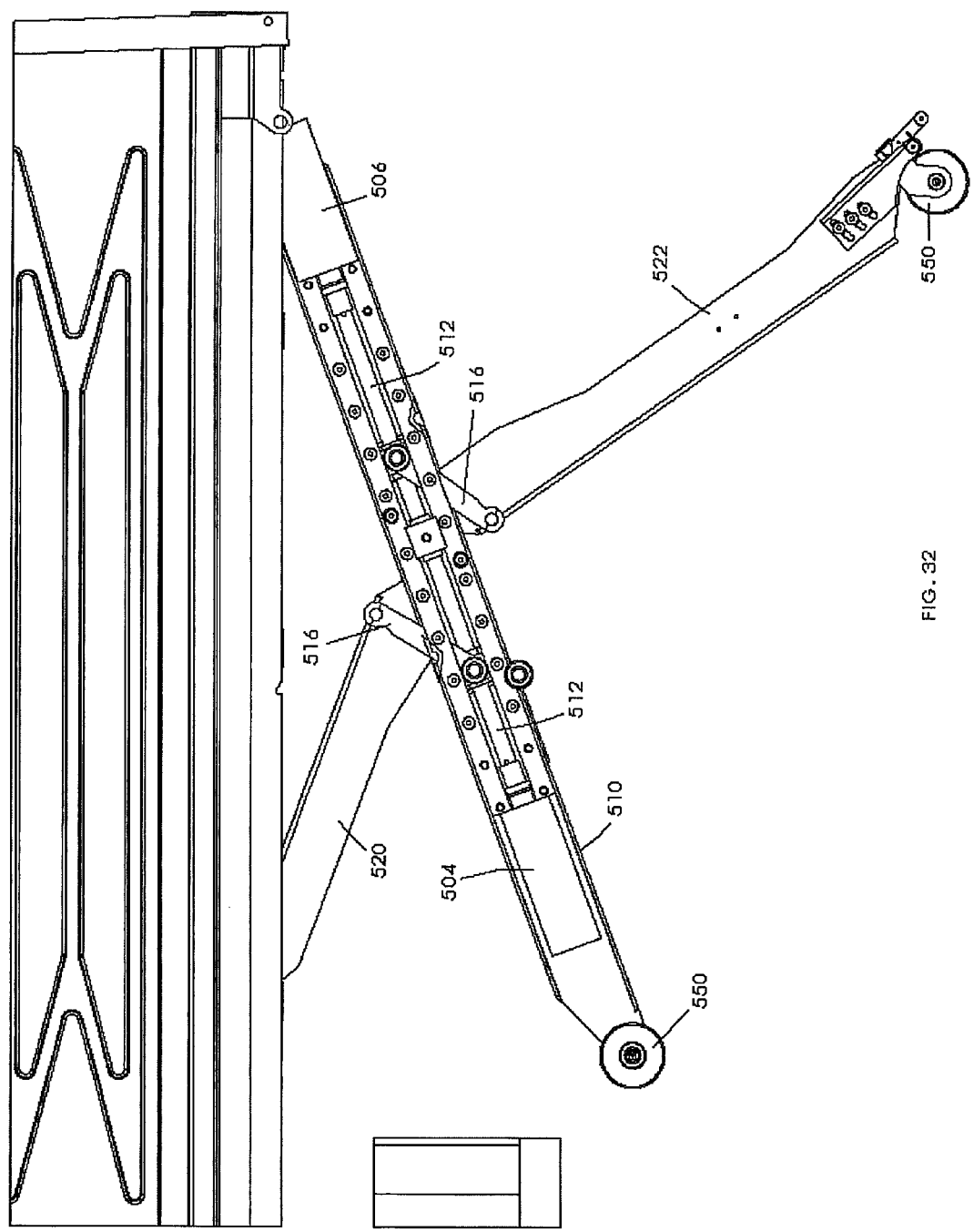
Figure 33:
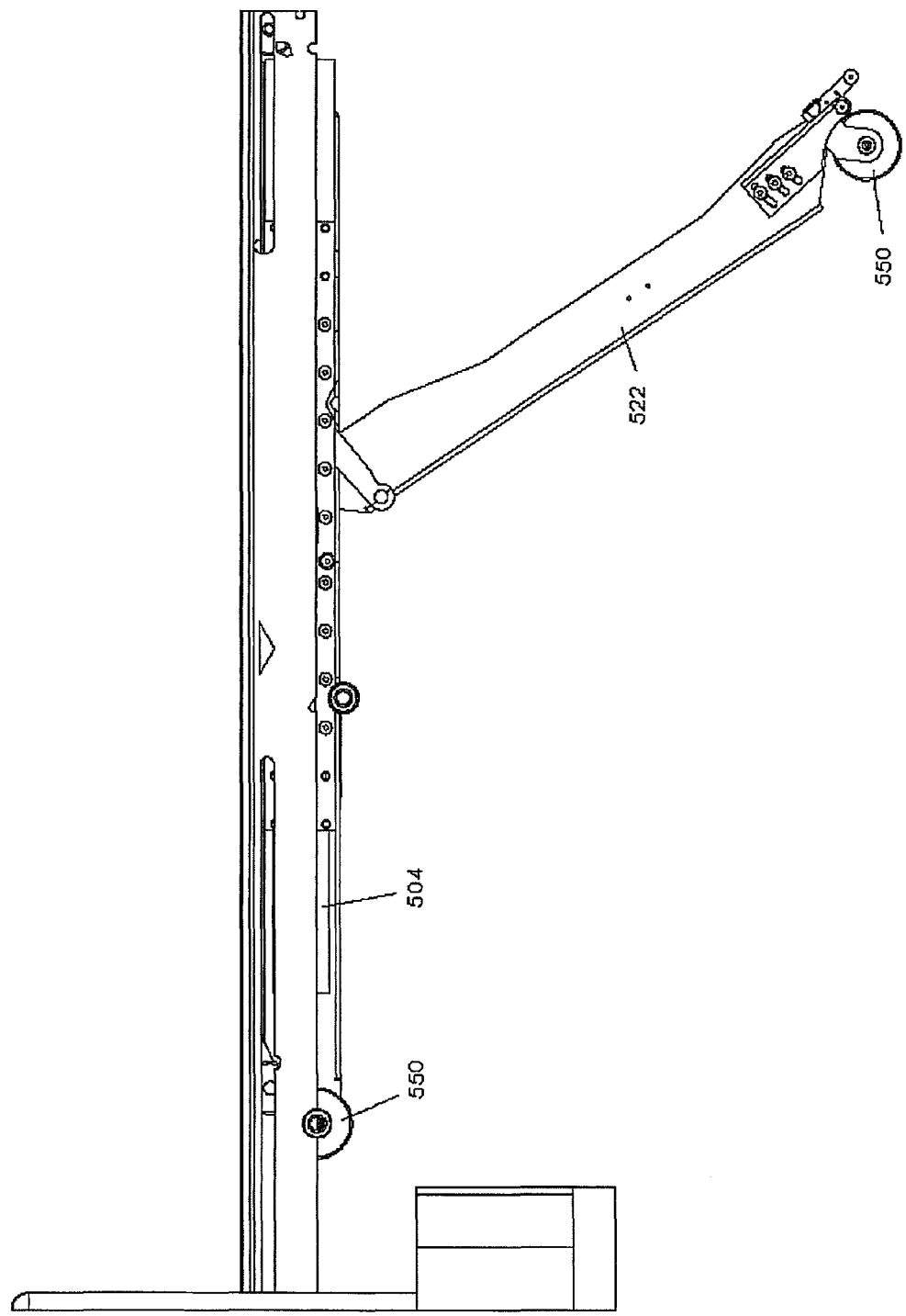
Figure 34:
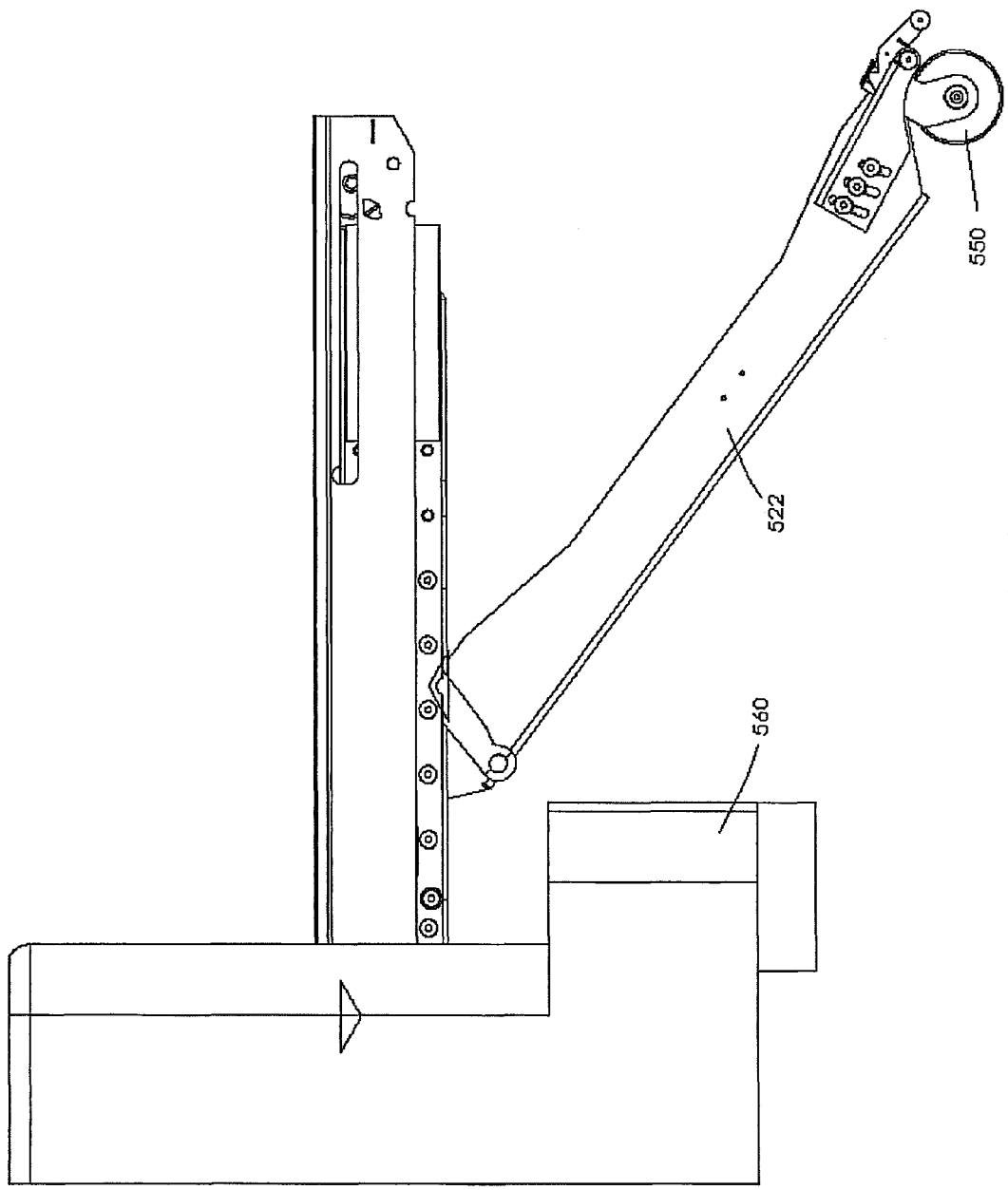
Figure 35:
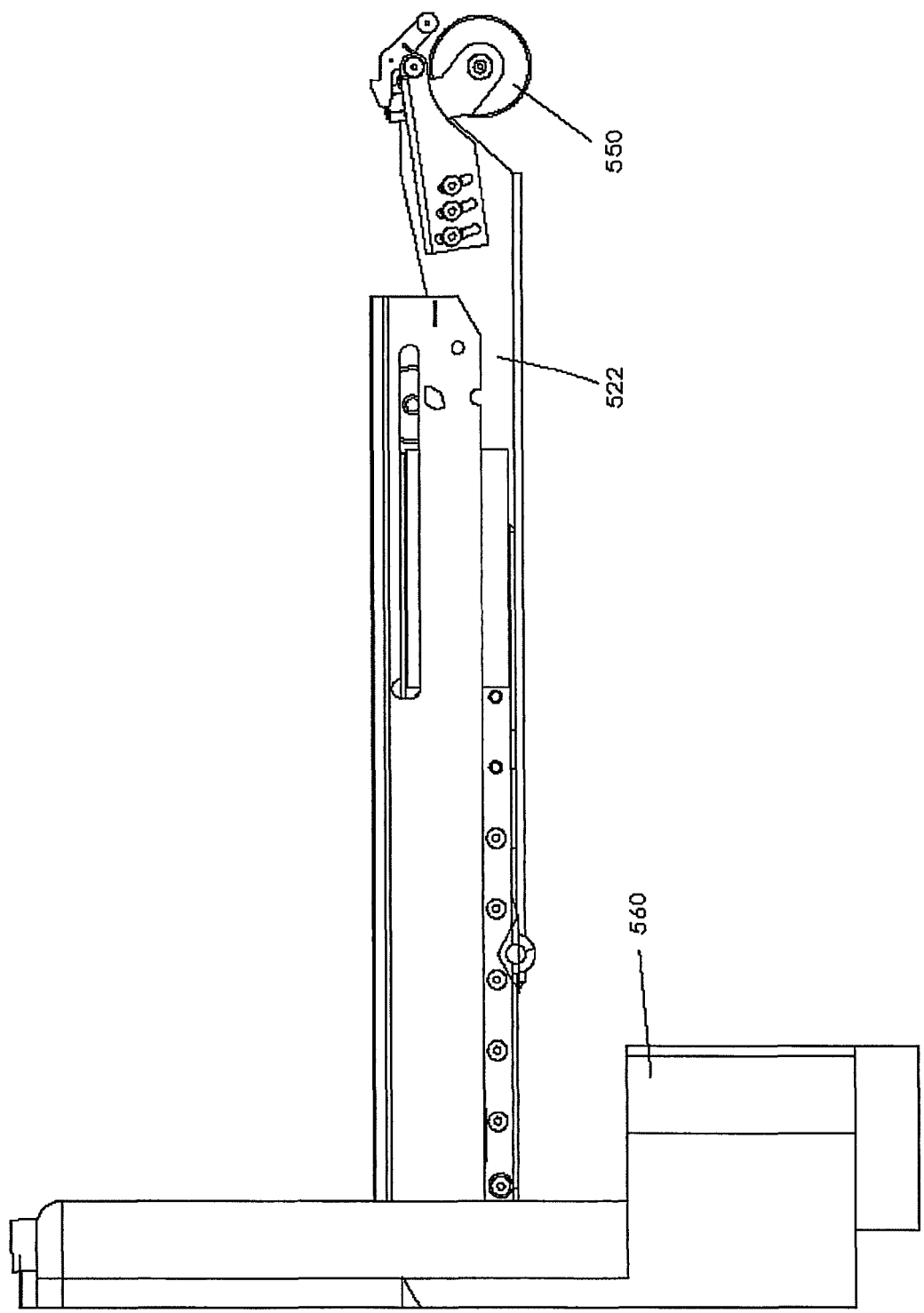
Figure 36:
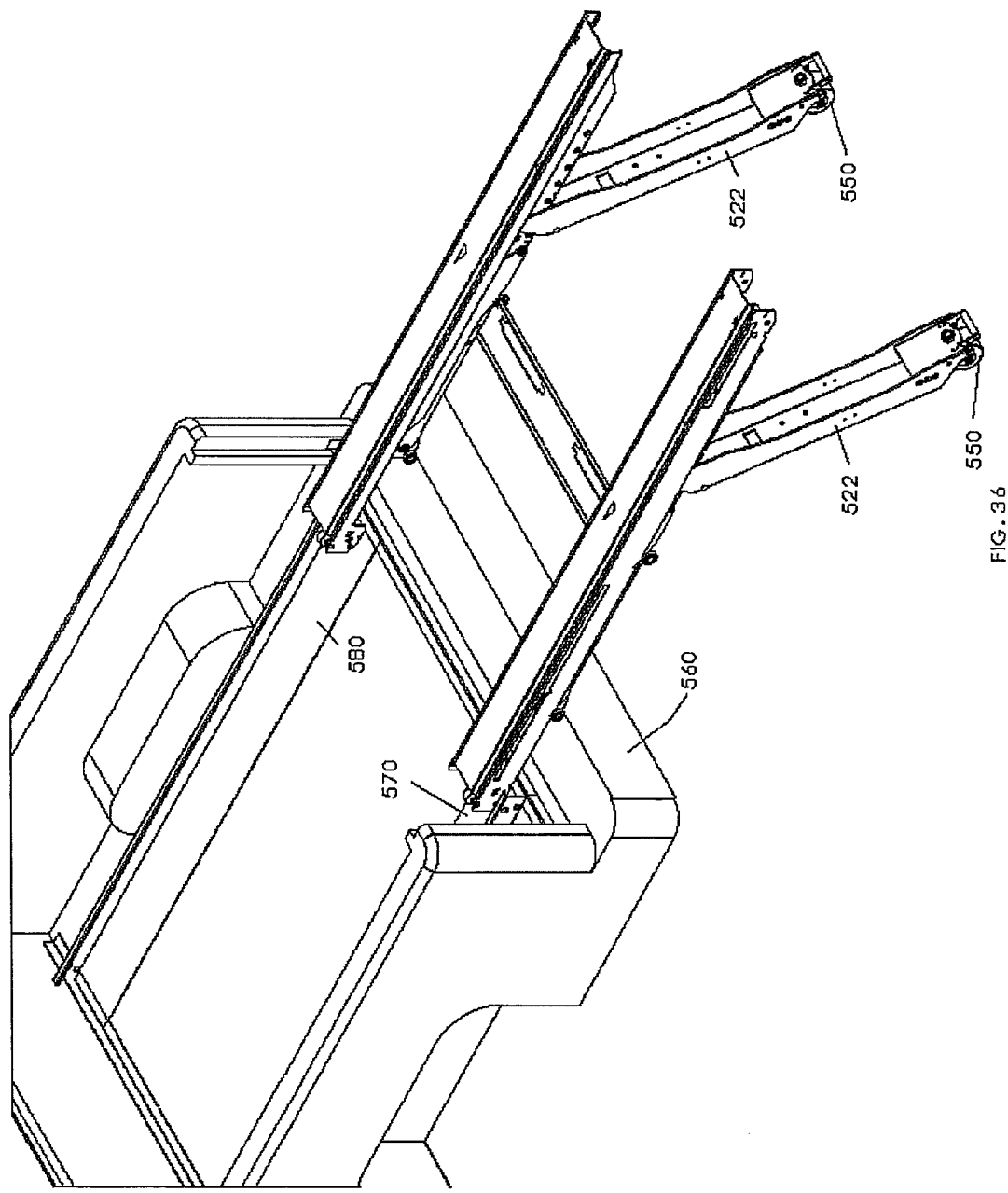

Another advantage that can be achieved by eliminating the base rail is more particularly illustrated in FIG. 32. For example, by operating just the first motors 504, the front leg portions 520 are rotated toward the nested position beneath the base of the carrier 502. Likewise, the rear leg portions 522 rotate to a more vertical position which thereby raises the rear of the carrier 502 (FIG. 33). As a result, the lift assembly 500 can be rolled into the vehicle until such time as the rear leg portions 522 contact a bumper 560 of the vehicle (FIG. 34). In this manner, more of the weight of the lift assembly 500 is transferred into the cargo bay of the vehicle thereby reducing the load on the system as the rear leg portions 522 are then lifted to a nested position. Stated another way, the lift assembly 500 is only partially cantilevered out of the back of the vehicle (FIG. 35) during such times as the rear leg portions 522 are lifted to the nested position, and the lift assembly 500 may be pushed into the vehicle and into the cavities or channels beneath the carrier 502.

Figure 37:
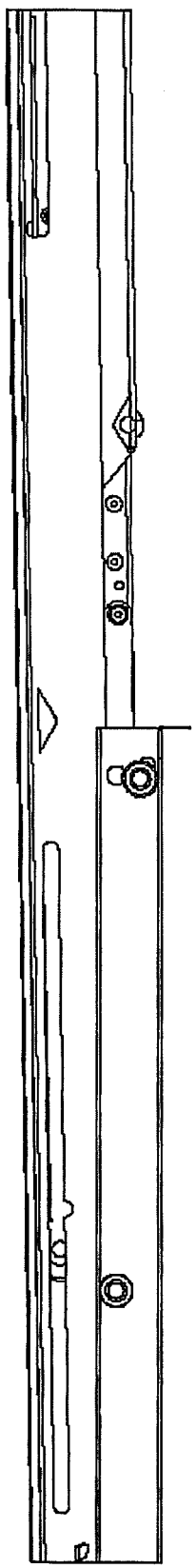

Turning to FIG. 37, rails 570, 580 may be installed in the cargo bay of the vehicle to facilitate rolling the lift assembly 500 in and out of the vehicle. Rollers (not shown) located on the lift legs 510, 520, 522 engage in a respective rail 570 or 580 and provide for smooth movement and the necessary support required for the cantilever position illustrated, for example, in FIG. 35.

Figure 38:
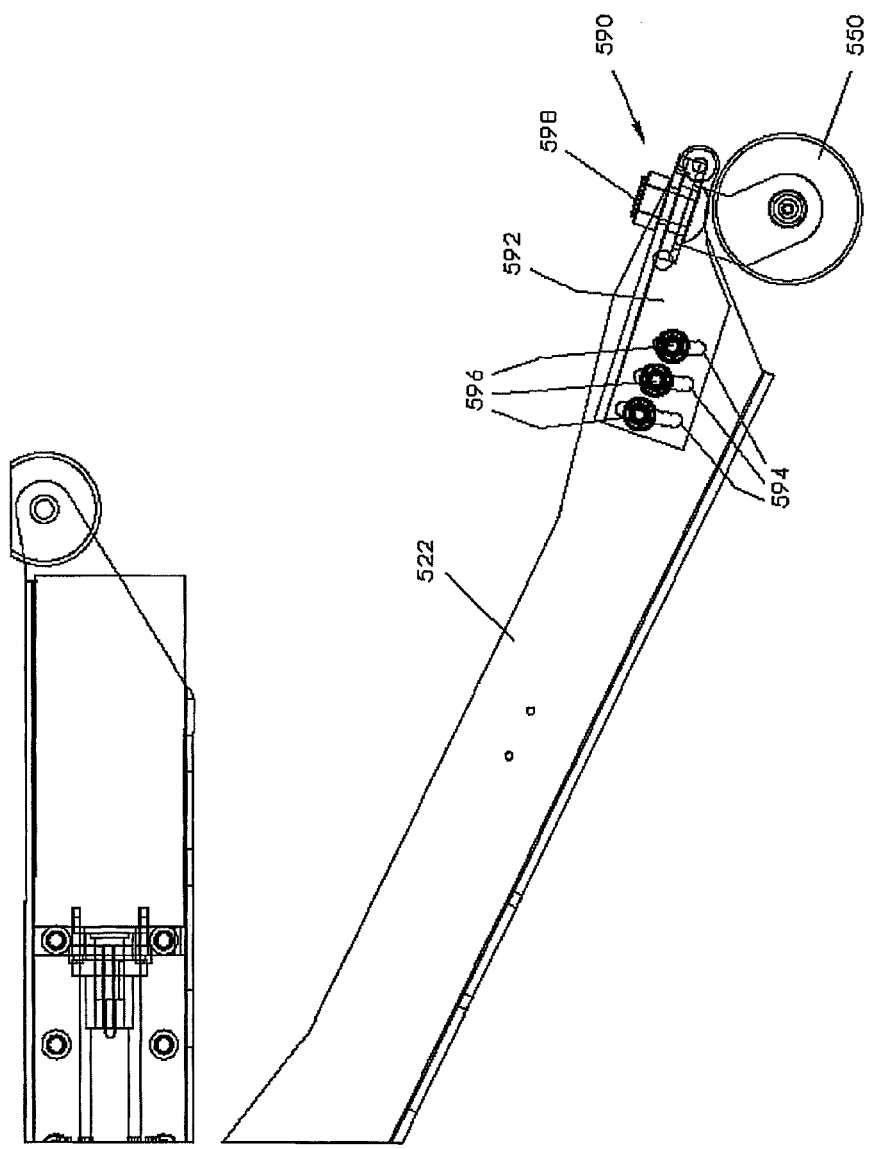
FIGS. 38-42 show still other features of the loading/unloading system.
Figure 39:
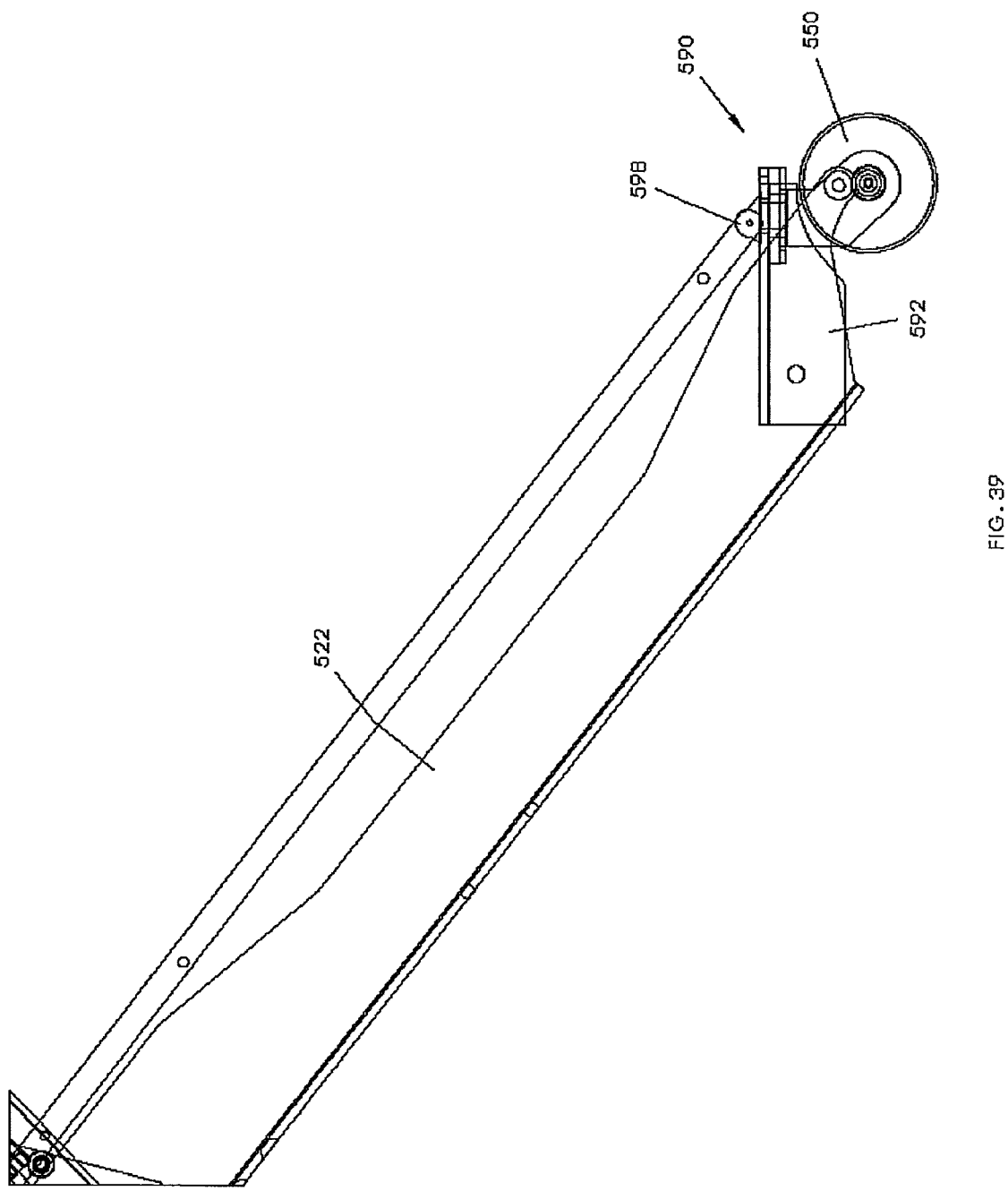

Another modification is illustrated in FIG. 38. Particularly, the enlarged rollers 550 that selectively engage the ground may be made more maneuverable by incorporating a swivel or caster wheel mechanism 590. Preferably, an angled plate 592 is mounted to a distal end of the second leg portion 522. The angled plate includes a series of elongated openings 594 which each receive a pin 596 therethrough so that the plate can pivot through a limited range relative to the end of the lift leg. A rotational or swivel axis 598 of the caster wheel mechanism 590 is thus oriented in a fashion so that the axis 598 remains substantially vertical. That is, the plate 592 can pivot through a selected range of motion defined by the respective pins 596 engaging opposite ends of respective elongated openings 594. As lift leg portions 522 move up and down, the plate 592 remains level and thereby the rotational axis of the caster mechanism remains substantially vertical.

Figure 40:
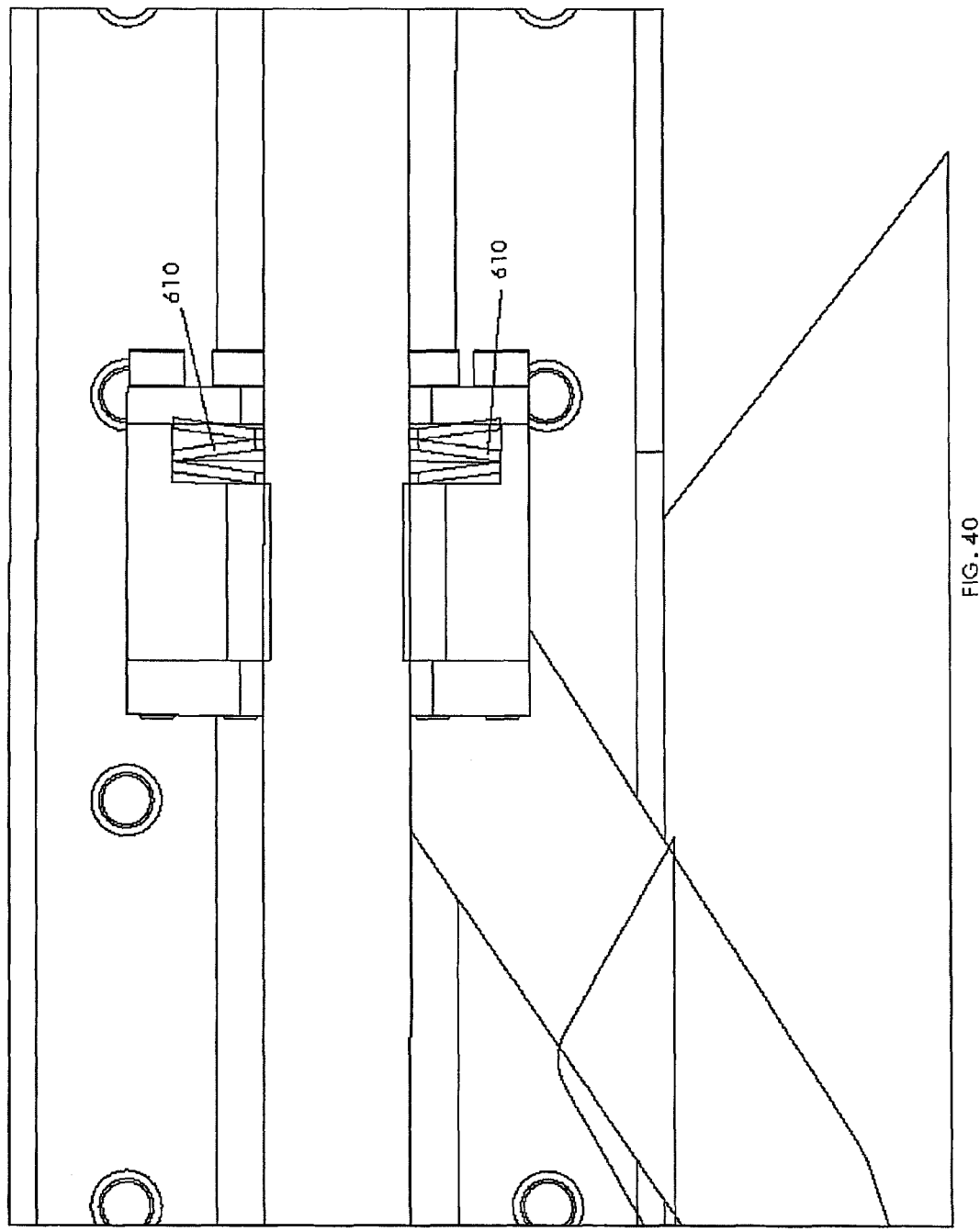

When the motors 504, 506 move the legs to the nested position, it is desirable that the legs 510, 520, 522 make contact with each other to assure the correct dimension and thereby allow the lift assembly to slide properly under the carrier 502. This creates a situation where the motor or drive screw mechanism could easily be damaged if the motors 502, 504 continue to run after the legs make abutting, mechanical contact. To prevent this situation, the drive block 514 may incorporate disc springs 610 installed between a threaded sleeve and the block housing (FIG. 40). This configuration allows the threaded sleeve to continue a small amount of movement after the legs make hard contact, and in addition provides a spring force from spring 610 to assure a tight, rattle free nested lift. Thus, the disc springs allow a certain amount of over-travel of the motors when the legs are driven by the motors to the nested position.

Figure 41:
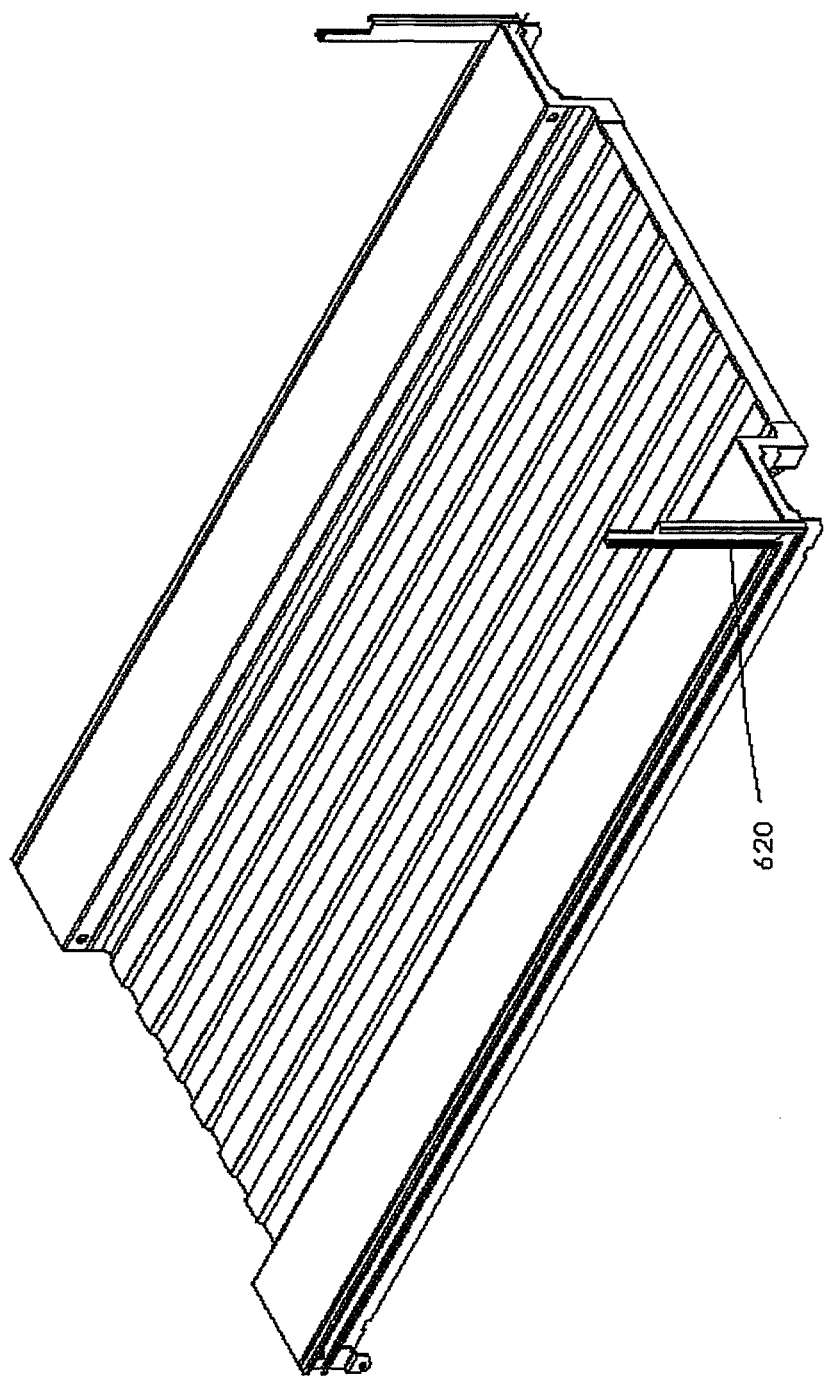
Figure 42:
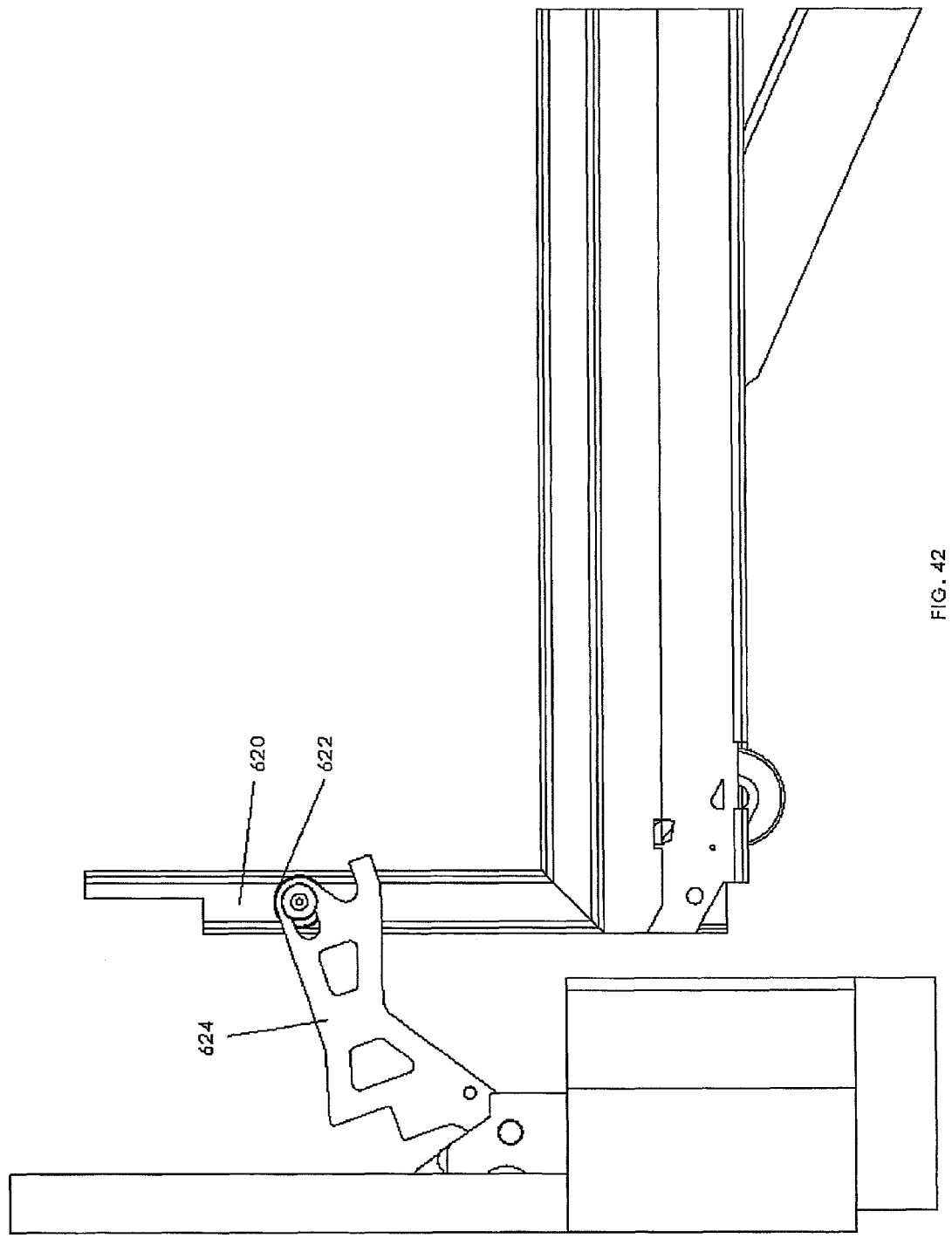

As is further illustrated in FIG. 41, guiding the carrier 502 into the cargo bay of the vehicle can be improved. Specifically, upwardly extending rails 620 can be added to the sides of the carrier. Rollers 622 mounted on lever arms 624 (which pivot on a cross tube supported by the original tailgate mounting pins), engage these rails 620 to hold the carrier 502 at the proper distance from the vehicle and prevent the possibility of the carrier tipping sideways.

It is also contemplated that a controller or electronic circuitry may be incorporated into the lift assembly 500 to stop the motors 502, 504 at one or more predetermined heights, as well as at the nested position. Shut-off positions may be stored in a memory associated with the controller to provide for ease of operation, and greater control over the lift assembly 500. In addition, the controller would cooperate with level sensors that would activate an error code if the operator/user attempts to operate the lift 500 at an unsafe angle. Likewise, the controller can be arranged to automatically level the carrier 502 when exposed to slightly angled surfaces. The controller may also include overload sensors such as electric current sensors to sense an overload situation imposed on the motors. Still further, if one motor is working harder than the other motor, the overload or unbalanced situation would be sensed and alert the user/operator that the load may not be properly centered. The electronic controller and associated memory can be programmed to stop the lift at a predetermined height of the cargo bay for a particular vehicle. It is contemplated that smart phone applications, for example, can be used to operate the lift in a remote, hands free arrangement.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. One skilled in the art will also recognize that features from one embodiment may be used with features from another embodiment even though not particularly described herein or shown in the drawings.

What is claimed is:

1. A lift mechanism (130) for an associated cargo carrier (110) comprising:
   a rail (140, 150) configured for sliding movement between a first position received within a footprint of the carrier and a second position extended outwardly from the carrier footprint;

a leg assembly (160, 162) configured for extending movement between a first position received in the rail (140, 150) and a second position extending outwardly from the rail wherein when the rail and leg assembly are in the respective first positions the leg assembly is stored along the carrier, and when the rail and leg assembly are in the respective second positions, the leg assembly supports the cargo carrier;

a drive arrangement (200-214) for selectively raising and lowering the leg assembly between the first and second positions to raise and lower the cargo carrier; and wherein the leg assembly includes first and second legs (160, 162), one of the first and second legs (160, 162) includes first and second leg portions (160a, 160b) that articulate relative to one another, and wherein the carrier (110) is configured to tilt relative to horizontal by selectively disconnecting one of the first and second leg portions (160a, 160b) from the drive arrangement (200-214) and driving the remaining leg portion for articulating action relative to the other leg portion.

2. The lift mechanism (130) of claim 1 wherein the first and second legs (160, 162) selectively pivot relative to one another and also selectively pivot relative to the rail (140, 150).

3. The lift mechanism (130) of claim 2 wherein the first and second legs (160, 162) are pivotally connected to one another along respective mid-portions to provide an x-shaped or scissors-shaped lift arrangement.

4. The lift mechanism (130) of claim 1 wherein the leg assembly (160, 162) is dimensioned and configured for nesting receipt in the rail (140, 150) in the first position of each of the rail and leg assembly.

5. The lift mechanism (130) of claim 1 wherein the drive arrangement (200-214) includes detachable first and second links (210, 212) and a slide bolt (224) that selectively engage the first and second leg portions (160a, 160b) together in a first position so that the leg portions are locked in linear alignment, and are selectively disengaged in a second position that allows the first and second leg portions to articulate relative to one another and causes the associated carrier (110) to tilt as the drive arrangement is raised or lowered.

6. The lift mechanism (130) of claim 5 wherein the drive arrangement (200-214) includes an oppositely threaded drive screw (202) driven by a motor (200) wherein the drive screw has a right-hand pitch first portion on a first end and a left-hand pitch second portion on a second end, and only one of the leg portions (160a, 160b) operatively engages the oppositely threaded drive screw so that rotation of the drive screw drives only one of the first and second leg portions.

7. The lift mechanism (130) of claim 1 wherein the drive arrangement (200-214) includes a drive block (204) that has a split nut (400) selectively engaging and disengaging a drive screw (202) of the drive arrangement.

8. The lift mechanism (130) of claim 7 wherein the drive arrangement (200-214) further includes a solenoid that selectively urges the split nut into engagement with the drive screw (202).

9. The lift mechanism (130) of claim 1 wherein the leg portions (160a, 160b) have different hinge points (440, 442) connecting the leg portions to the second leg (162).

10. The lift mechanism (130) of claim 1 wherein the first and second legs (160, 162) each have rollers (178) that engage the rail (140, 150) so that the lift mechanism (130) can be extended and retracted relative to the associated cargo carrier (110).

11. The lift mechanism (130) of claim 1 wherein the rail (140) is supported at a first end by a support leg (190) that is connected by either (i) a lever (250) that has a bearing (252) received in the rail (140), and the lever is biased by a spring (254) or (ii) a cable (260), and supported at a second end by a roller (156).

12. The lift mechanism (130) of claim 1 wherein the leg assembly (160, 162) is dimensioned for nested receipt in the rail (140, 150) in a collapsed condition.

13. The lift mechanism (130) of claim 1 further comprising a hinged bridge (154) that extends between a first end of the rail (140) and an associated vehicle and the hinged bridge is configured to travels upwardly and downwardly in response to a changing level of the associated vehicle.

14. The lift mechanism (130) of claim 1 wherein first and second legs (160, 162) have rollers (178) at first and second ends of each leg for engaging a transfer rail 140 at a first end and a base rail (150) at a second end.

15. The lift mechanism (130) of claim 14 wherein at least one of the first and second legs includes first and second rollers (178', 178") at one end to eliminate a gap between the roller and associated rail (140, 150).

16. The lift mechanism (130) of claim 1 further comprising a cross bar (280) configured for attachment to an associated vehicle along a pivot region of a tailgate with the vehicle, the cross bar including at least one motor-driven (280) roller (270) for advancing and retracting the leg assembly (160, 162), rail (140, 150), and carrier (110) in and out of a bed of the associated vehicle.

17. The lift mechanism (130) of claim 16 further comprising latches (284) that selectively engage the carrier (110) to prevent the carrier, leg assembly, and rail from being extended from the associated vehicle bed.

18. The lift mechanism (130) of claim 1 further comprising a mechanism for raising the leg assembly into nested relation in the rail (140, 150) having one of (i) a fine pitch screw portion (300) and a coarse pitch screw portion (302) with a tube (304) or (ii) a flexible cable (310) and pulley (314) assembly.

19. The lift mechanism (130) of claim 1 further comprising a lever (330) provided on one end of the leg assembly (160, 162) to provide a mechanical advantage to initiate lifting of the carrier from the first position of the rail.

20. The lift mechanism (130) of claim 1 further comprising a tailgate having at least one of (i) an opening (346) in the tailgate or (ii) a central reduced height section (350) to facilitate a driver's view to the rear.

21. The lift mechanism (130) of claim 1 further comprising a spool (450) mounted on one end of a drive screw (202) of the drive arrangement, the spool including a clutch assembly (452, 460, 470) that selectively allows the spool to rotate with or rotate freely relative to the drive screw.

22. The lift mechanism of claim 1 wherein the first and second legs each include a roller at a distal end thereof.

23. The lift mechanism of claim 22 wherein the rollers are mounted to the respective legs by caster mechanisms.

24. The lift mechanism of claim 23 further comprising a self-leveling connection between each caster mechanism and associated leg.

25. The lift mechanism of claim 1 wherein the drive arrangement includes an over-travel mechanism to limit potential damage thereto.

26. The lift mechanism of claim 1 wherein the carrier includes the rail extending therefrom for holding the carrier a distance from an associated vehicle as the carrier is loaded and unloaded.

27. The lift mechanism of claim 1 further comprising a sensor and controller for monitoring a load imposed on first and second motors of the drive arrangement.

28. A lift mechanism (130) for an associated cargo carrier (110) comprising:
- a rail (140, 150) configured for sliding movement between a first position received within a footprint of the carrier and a second position extended outwardly from the carrier footprint;
- a leg assembly (160, 162) configured for extending movement between a first position received in the rail (140, 150) and a second position extending outwardly from the rail wherein when the rail and leg assembly are in the respective first positions the leg assembly is stored along the carrier, and when the rail and leg assembly are in the respective second positions, the leg assembly supports the cargo carrier;
- a drive arrangement (200-214) for selectively raising and lowering the leg assembly between the first and second positions to raise and lower the cargo carrier wherein the leg assembly includes a first leg and a second leg, the second leg includes first and second portions that selectively pivot relative to one another, the first leg includes first and second motors respectively connected to the first and second portions of the second leg for individually altering an angle therebetween.

29. A lift mechanism (130) for an associated cargo carrier (110) comprising:
- a rail (140, 150) configured for sliding movement between a first position received within a footprint of the carrier and a second position extended outwardly from the carrier footprint;
- a leg assembly (160, 162) configured for extending movement between a first position received in the rail (140, 150) and a second position extending outwardly from the rail wherein when the rail and leg assembly are in the respective first positions the leg assembly is stored along the carrier, and when the rail and leg assembly are in the respective second positions, the leg assembly supports the cargo carrier, wherein the leg assembly includes first and second legs (160, 162), and one of the first and second legs (160, 162) includes first and second leg portions (160a, 160b) that articulate relative to one another; and
- a drive arrangement (200-214) for selectively raising and lowering the leg assembly between the first and second positions to raise and lower the cargo carrier wherein the drive arrangement (200-214) includes an oppositely threaded drive screw (202) driven by a motor (200) wherein the drive screw has a right-hand pitch first portion on a first end and a left-hand pitch second portion on a second end, and only one of the leg portions (160a, 160b) operatively engages the oppositely threaded drive screw so that rotation of the drive screw drives only one of the first and second leg portions.

\* \* \* \* \*